United States Patent
Fujino et al.

(10) Patent No.: US 8,802,800 B2
(45) Date of Patent: Aug. 12, 2014

(54) PRODUCTION METHOD FOR WATER-ABSORBENT RESIN

(75) Inventors: Shinichi Fujino, Himeji (JP); Kozo Nogi, Himeji (JP); Kunihiko Ishizaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 13/392,698

(22) PCT Filed: Aug. 30, 2010

(86) PCT No.: PCT/JP2010/064745
§ 371 (c)(1),
(2), (4) Date: Feb. 27, 2012

(87) PCT Pub. No.: WO2011/025012
PCT Pub. Date: Mar. 3, 2011

(65) Prior Publication Data
US 2012/0157644 A1    Jun. 21, 2012

(30) Foreign Application Priority Data

Aug. 28, 2009 (JP) ................................ 2009-197962
Aug. 28, 2009 (JP) ................................ 2009-197963

(51) Int. Cl.
*C08F 2/00* (2006.01)
*C08F 20/06* (2006.01)

(52) U.S. Cl.
USPC ..................................................... 526/317.1

(58) Field of Classification Search
USPC ..................................................... 526/317.1
See application file for complete search history.

(56) References Cited

U.S. PATENT DOCUMENTS

| | | |
|---|---|---|
| 4,920,202 A | 4/1990 | Irie et al. |
| 5,005,771 A | 4/1991 | Pieh et al. |
| 5,229,487 A | 7/1993 | Tsubakimoto et al. |
| 5,945,495 A | 8/1999 | Daniel et al. |
| 6,187,902 B1 | 2/2001 | Yanase et al. |
| 6,207,796 B1 | 3/2001 | Dairoku et al. |
| 6,291,636 B1 | 9/2001 | Miyake et al. |
| 6,576,713 B2 * | 6/2003 | Ishizaki et al. ............. 525/329.7 |

(Continued)

FOREIGN PATENT DOCUMENTS

| | | |
|---|---|---|
| JP | 54-053165 | 4/1979 |
| JP | 64-060683 | 3/1989 |

(Continued)

OTHER PUBLICATIONS http://en.wikipedia.org/wiki/Belt_dryer (printed on Jul. 25, 2013).*

(Continued)

*Primary Examiner* — Vu A Nguyen
(74) *Attorney, Agent, or Firm* — Cesari and McKenna, LLP

(57) ABSTRACT

A production method for a water-absorbent resin, comprising a polymerization step for obtaining hydrogel by subjecting a monomer aqueous solution to a polymerization reaction, and a drying step for drying the hydrogel, wherein drying in the drying step is performed using a continuous through-flow belt-type drying machine, the pore opening rate of the through-flow belt in the continuous through-flow belt-type drying machine is 20 to 50%, the solid content of the hydrogel supplied to the drying step is 35% by weight or more, and the area occupancy rate of the hydrogel is 85 to 100% relative to the through-flow belt.

22 Claims, 2 Drawing Sheets

(56) References Cited

U.S. PATENT DOCUMENTS

| | | | |
|---|---|---|---|
| 6,641,064 | B1 | 11/2003 | Dentler et al. |
| 6,906,159 | B2 | 6/2005 | Dairoku et al. |
| 2001/0025093 | A1 | 9/2001 | Ishizaki et al. |
| 2004/0110897 | A1 | 6/2004 | Sakamoto et al. |
| 2004/0234607 | A1 | 11/2004 | Irie et al. |
| 2006/0183828 | A1 | 8/2006 | Dairoku et al. |
| 2007/0041796 | A1* | 2/2007 | Irie et al. ............ 407/30 |
| 2007/0123624 | A1 | 5/2007 | Otten et al. |
| 2007/0149691 | A1* | 6/2007 | Ishizaki et al. ........ 524/500 |
| 2008/0021150 | A1 | 1/2008 | Becker et al. |
| 2008/0214749 | A1 | 9/2008 | Weismantel et al. |
| 2008/0287631 | A1 | 11/2008 | Nitschke |
| 2010/0001233 | A1 | 1/2010 | Funk et al. |
| 2010/0016522 | A1 | 1/2010 | Stueven et al. |
| 2010/0041549 | A1 | 2/2010 | Weismantel et al. |
| 2010/0062252 | A1 | 3/2010 | Kimura et al. |
| 2010/0249320 | A1 | 9/2010 | Matsumoto et al. |

FOREIGN PATENT DOCUMENTS

| | | |
|---|---|---|
| JP | 7-270070 | 10/1995 |
| JP | 8-073518 | 3/1996 |
| JP | 10-059534 | 3/1998 |
| JP | 11-292919 | 4/1998 |
| JP | 2002-121291 | 2/2000 |
| JP | 2000-143720 | 5/2000 |
| JP | 2002-226599 | 2/2001 |
| JP | 2001-018222 | 3/2001 |
| JP | 2003-261601 | 12/2001 |
| JP | 2003-012812 | 1/2003 |
| JP | 2006-299234 | 2/2005 |
| JP | 2006-160774 | 6/2006 |
| JP | 2007-224224 | 9/2007 |
| WO | 2007/057350 | 5/2007 |
| WO | 2008/034786 | 3/2008 |
| WO | 2008/037676 | 4/2008 |
| WO | 2008/087114 | 7/2008 |
| WO | 2009/028568 | 2/2009 |

OTHER PUBLICATIONS http://www.andritz.com/products-and-services/pf-detail.htm?productid=24494 (printed on Jul. 25, 2013).* http://www.mcnichols.com/products/perforated/round-hole (printed on Jul. 25, 2013).*

* cited by examiner

PRODUCTION METHOD FOR WATER-ABSORBENT RESIN

CROSS-REFERENCE TO RELATED APPLICATIONS

This application is a National Stage of International Application No. PCT/JP2010/064745, filed on Aug. 30, 2010, which claims priority to Japanese Application No. 2009-197963 filed Aug. 28, 2009, and Japanese Application No. 2009-197962 filed Aug. 28, 2009. The content of the prior applications are incorporated herein by reference in their entirety.

TECHNICAL FIELD

The present invention relates to a production method for a water-absorbent resin. In more detail, the present invention relates to improvement of a drying step of hydrogel for efficiently producing the water-absorbent resin having excellent property.

BACKGROUND ART

The water-absorbent resin (Super Absorbent Polymer; SAP) is a water-swelling and water-insoluble polymer gelling agent, and is widely used mainly in disposable use as absorbent articles such as disposable diapers, sanitary napkins and the like; water-retention agent for agriculture and gardening; water-stops for industrial use; and the like. As a raw material of such a water-absorbent resin, many monomers or hydrophilic polymers have been proposed. In particular, a polyacrylic acid (salt)-type water-absorbent resin using acrylic acid and/or a salt thereof (hereafter may be referred to also as "acrylic acid (salt)") as a monomer, is produced most industrially in view of high water absorbing performance thereof.

The water-absorbent resin is generally produced by finely granulating hydrogel, obtained by polymerization of a monomer in an aqueous solution (a hydrogel-like polymer), during polymerization or after polymerization, as needed, and drying it.

As a drying method for hydrogel, there has been known a method for using a belt-type drying machine (PATENT LITERATURES 1 to 5), a method for performing thin film drying using a drum dryer or the like (PATENT LITERATURE 6), a method for performing azeotropic dehydration in an organic solvent (PATENT LITERATURE 7), a method for drying using a fluidized bed (PATENT LITERATURE 8), a method for performing oscillating fluidized drying (PATENT LITERATURE 9), a method for stirring drying using a rotor (PATENT LITERATURE 10), or the like.

In addition, as drying condition of hydrogel, there has been proposed a method for controlling dew point or temperature to enhance property (for example, reduction of a residual monomer, enhancement of absorbency, reduction of a water-soluble component) (PATENT LITERATURES 11 and 12), a method for performing stirring drying by coarse pulverization in the middle of drying (PATENT LITERATURE 13), or the like.

Further, there may be the case where a undried substance (undried gel) generates in a drying step of hydrogel, and because presence of such a undried substance provides excessive load to a pulverization machine during a pulverization step after the drying step, it has also been known a method for removing said undried substance (PATENT LITERATURES 14 to 16). In addition, there has been known a method for specifying fluidity of hydrogel not to produce the undried substance (PATENT LITERATURE 17), a method for using a leveling apparatus of hydrogel in the drying machine (PATENT LITERATURES 18 and 19), a drying method using a constant supplying apparatus for supplying the specific amount of hydrogel to the drying machine (PATENT LITERATURE 20), a method for using infra-red ray or the like in combination, in addition to hot air in drying (PATENT LITERATURE 21), or the like. In addition to these, a method for adding additives such as a surfactant, inorganic fine particles to hydrogel, to enhance drying efficiency (PATENT LITERATURES 22 to 26) has also been known. In addition, a drying method suitable for hydrogel having low neutralization rate (PATENT LITERATURE 27) has also been proposed. In addition, in crushing hydrogel with a solid content of 50 to 70% by weight, using a screw extruder, technique for drying after crushing by supplying 0.1 to 30 parts by weight of water, relative to 100 parts by weight of said hydrogel, preferably drying using the through-flow belt (PATENT LITERATURE 28) has also been proposed.

PRIOR ART LITERATURE

Patent Literature

PATENT LITERATURE 1: US-A-2008/214749 specification
PATENT LITERATURE 2: WO 2008/087114 pamphlet
PATENT LITERATURE 3: WO 2008/037676 pamphlet
PATENT LITERATURE 4: JP-A-1996(8)-073518
PATENT LITERATURE 5: JP-A-1995(7)-270070
PATENT LITERATURE 6: JP-A-1979(54)-053165
PATENT LITERATURE 7: JP-A-1989(64)-060683
PATENT LITERATURE 8: U.S. Pat. No. 6,906,159 specification
PATENT LITERATURE 9: JP-A-2001-018222
PATENT LITERATURE 10: U.S. Pat. No. 5,005,771 specification
PATENT LITERATURE 11: U.S. Pat. No. 4,920,202 specification
PATENT LITERATURE 12: U.S. Pat. No. 6,207,796 specification
PATENT LITERATURE 13: U.S. Pat. No. 6,187,902 specification
PATENT LITERATURE 14: U.S. Pat. No. 6,291,636 specification
PATENT LITERATURE 15: U.S. Pat. No. 6,641,064 specification
PATENT LITERATURE 16: WO 2007/057350 pamphlet
PATENT LITERATURE 17: US-A-2008/0021150 specification
PATENT LITERATURE 18: JP-A-1998(10)-05953
PATENT LITERATURE 19: U.S. Pat. No. 5,229,487 specification
PATENT LITERATURE 20: JP-A-2003-012812
PATENT LITERATURE 21: JP-A-2007-224224
PATENT LITERATURE 22: JP-A-2000-143720
PATENT LITERATURE 23: JP-A-2002-226599
PATENT LITERATURE 24: US-A-2007/123624 specification
PATENT LITERATURE 25: JP-A-2006-160774
PATENT LITERATURE 26: U.S. Pat. No. 5,945,495 specification
PATENT LITERATURE 27: WO 2008/034786 pamphlet
PATENT LITERATURE 28: US-A-2004/0234607 specification

SUMMARY OF INVENTION

Problem to be Solved by the Invention

In recent years, because of demand increase in diapers in emerging nations, expansion of a production scale of the water-absorbent resin has been required. Therefore, there has been tendency toward scale up per line or increase in polymerization concentration (to make higher concentration of a monomer in an aqueous solution; for example, refer to the PATENT LITERATURE 7).

However, with expansion of the production scale, decrease in property of the water-absorbent resin or troubles in scale up has occurred frequently. For example, according to the drying method of the above PATENT LITERATURES 1 to 13, there was observed generation of an undried substance in scale up, or decrease in property of the water-absorbent resin accompanied with excessive drying. In addition, because removal of the undried substance, in the above PATENT LITERATURES 14 to 16, is an additional step, it accompanies cost up or complicated plant operation. Further, in the method for using the additives in the above PATENT LITERATURES 21 to 26, there was also the case accompanying not only cost up but also decrease in property of the water-absorbent resin (for example, decrease in surface tension, decrease in absorbency against pressure, coloring), caused by the additives.

Generation of the above problems was particularly significant with increase in solid content of hydrogel (35% by weight or higher, still more 40% by weight or higher, particularly 45% by weight or higher). Further, although the PATENT LITERATURE 27 has disclosed drying of hydrogel with low neutralization, and the PATENT LITERATURE 28 has disclosed fine granulation and drying of hydrogel with high concentration, even by technique based on these, it has not yet been possible to solve the problems sufficiently.

Accordingly, it is an object of the present invention to provide the production method for the water-absorbent resin, which enables to efficiently provide the water-absorbent resin having excellent property.

Means for Solving the Problem

The present inventors have intensively studied a way to solve the above problems and as a result, have found that, in the drying step of hydrogel having high solid content, by controlling pore opening rate of an through-flow belt in a continuous through-flow belt-type drying machine, and area occupancy rate of hydrogel on the through-flow belt, the above problems can be solved, and have thus completed the present invention.

That is, the production method for the water-absorbent resin of the present invention (a first method) is a production method for a water-absorbent resin, including a polymerization step for obtaining hydrogel by subjecting a monomer aqueous solution to a polymerization reaction; and a drying step for drying the hydrogel; characterized in that drying in the drying step is performed using a continuous through-flow belt-type drying machine; pore opening rate of the through-flow belt in the continuous through-flow belt-type drying machine is 20 to 50%; solid content of the hydrogel supplied to the drying step is 35% by weight or more; and area occupancy rate of the hydrogel is 85 to 100% relative to the through-flow belt.

In addition, the production method for the water-absorbent resin of the present invention (a second method) is a production method for a water-absorbent resin, including a polymerization step for obtaining hydrogel by subjecting a monomer aqueous solution to a polymerization reaction; and a drying step for drying the hydrogel; characterized in that drying in the drying step is performed using a continuous through-flow belt-type drying machine; pore opening rate of the through-flow belt in the continuous through-flow belt-type drying machine is 20 to 50%; solid content of the hydrogel supplied to the drying step is 35% by weight or more; and width occupancy rate of the hydrogel is 85 to 100% relative to the through-flow belt.

In other word, the above first method and second method are characterized in that area occupancy rate and/or width occupancy rate of the hydrogel is 85 to 100% relative to the through-flow belt, and are preferably performed under condition of the area occupancy rate and width occupancy rate of the hydrogel are 85 to 100%.

Effect of the Invention

According to the production method for the water-absorbent resin of the present invention, the water-absorbent resin having excellent property can be produced efficiently.

MODE FOR CARRYING OUT THE INVENTION

Figure 1A:
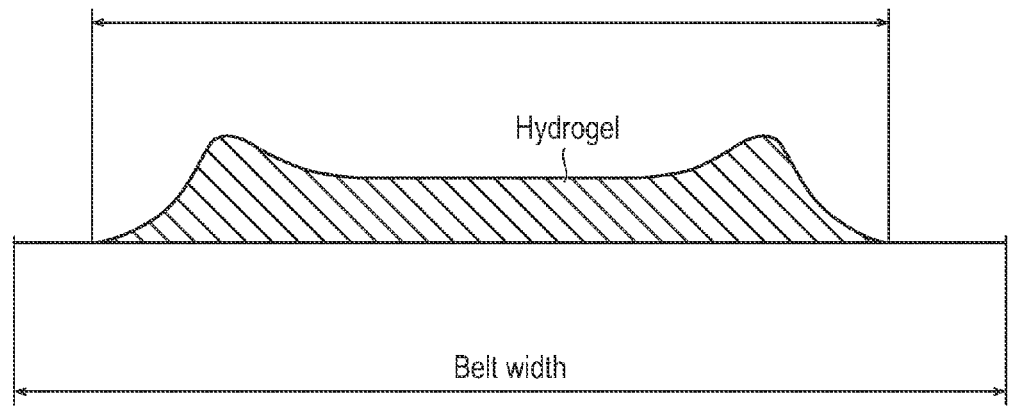
FIG. 1a is a cross-sectional view of a continuous through-flow belt-type drying machine in a travelling direction, and is a conceptual diagram where thickness of hydrogel is increased at the both end parts.

Explanation will be given below on preferable aspects of the present invention. The present aspect relates to a production method for a water-absorbent resin, including: a polymerization step for obtaining hydrogel by subjecting a monomer aqueous solution to a polymerization reaction; and a drying step for drying the hydrogel; wherein drying in the drying step is performed using a continuous through-flow belt-type drying machine; pore opening rate of the through-flow belt in the continuous through-flow belt-type drying machine is 20 to 50%; solid content of the hydrogel supplied to the drying step is 35% by weight or more; and area occupancy rate of the hydrogel is 85 to 100% relative to the through-flow belt.

DEFINITION OF TERMINOLOGY

Explanation will be given below on terminology to be used in the present description.

(a) Water-Absorbent Resin

In the present description, the "water-absorbent resin" means a water swelling and water insoluble polymer gelling agent, having the following properties. Absorbency (CRC) of the water-absorbent resin is essentially 5 g/g or more, preferably 10 to 100 g/g, and further preferably 20 to 80 g/g. In addition, extractables of the water-absorbent resin is essentially 0 to 50% by weight or less, preferably 0 to 30% by weight, further preferably 0 to 20% by weight, and particularly preferably 0 to 10% by weight.

It should be noted that the water-absorbent resin in the present description is not limited to the case composed of only a polymer having water-absorbing performance, and may include components other than the polymer, in a range enables to maintain various performances. Content of polyacrylic acid (salt) in the water-absorbent resin including polyacrylic acid (salt), as a polymer, is preferably 70 to 99.9% by weight, more preferably 80 to 99.7% by weight, and still more preferably 90 to 99.5% by weight, relative to total amount of the water-absorbent resin. As the components other than polyacrylic acid (salt), which may be included in the water-absorbent resin including such polyacrylic acid (salt), in view of enhancement of water absorbing speed or impact resistance, water is preferable, however, additives to be described later may be used, as needed.

(b) "Polyacrylic Acid (Salt)"

In the present description, the "polyacrylic acid (salt)" means a (co)polymer including an arbitrary graft component and obtained by (co)polymerization of acrylic acid (salt) as a principal component, as a monomer. Specifically, ratio of acrylic acid (salt) included in the monomer (excluding a cross-linking agent) composing polyacrylic acid (salt) is essentially in 50 to 100% by mole, preferably 70 to 100% by mole, further preferably 90 to 100% by mole, particularly preferably substantially 100% by mole, relative to total amount of the monomer. The salt as the (co)polymer essentially includes a water-soluble salt, preferably includes a monovalent salt, more preferably includes an alkali metal salt or an ammonium salt, still more preferably includes an alkali metal salt, and particularly preferably includes a sodium salt.

(c) Initial Coloring

In the present description, "initial coloring" means inevitable coloring in the production step of the water-absorbent resin. Said initial coloring is determined by using a measurement methods described in WO 2009/005114 pamphlet, as for the water-absorbent resin just after production (in Examples, it was measured within one hour after production), (for example, L/a/b value, YI value, WB value, or the like).

(d) Time Course Coloring

In the present description, "time course coloring" means coloring (usually yellowing or browning) occurring in storage of the water-absorbent resin in a non-used (non-swollen) state, for a long period of time. Said time course coloring occurs, for example, in the case of storage of non-used diapers in a warehouse or the like for a long period of time, which may lower product value. Because coloring is not recognized until several months or several years have passed in storage at room temperature, said time course coloring is usually verified using an accelerated test under high temperature and high humidity condition, described in WO 2009/00514 pamphlet.

(e) EDANA and ERT

"EDANA" is an abbreviation of European Disposables and Nonwovens Association. In addition, "ERT" is an abbreviation of the measurement method for the water-absorbent resin of the European standard (ERT/EDANA Recommended Test Method), and it is nearly a world standard. In the present description, property of the water-absorbent resin is measured with reference to the ERT original (known literature: revised in 2002), unless otherwise specified.

(f) "CRC" (ERT441.2-02)

"CRC" is an abbreviation of Centrifuge Retention Capacity, meaning absorbency against non-pressure (hereafter it may also be referred to "absorbency"). Specifically, it is specified as absorbency (unit; g/g) after immersing 0.200 g of the water-absorbent resin in nonwoven fabric 0.9% by weight sodium chloride aqueous solution for 30 minutes, and then draining off water by a centrifugal separation machine under 250 G.

(g) "AAP" (ERT442.2-02)

"AAP" is an abbreviation of Absorbency Against Pressure. Specifically, it is specified as absorbency (unit; g/g) after swelling 0.900 g of the water-absorbent resin in the aqueous solution of 0.9% by weight sodium chloride, under a load for 1 hour. In the present description, AAP was measured under a load condition of 21 $g/cm^2$ (0.3 psi) or 50 $g/cm^2$ (0.7 psi).

(h) "Extractables" (ERT470.2-02)

"Extractables" means amount of water-soluble components included in the water-absorbent resin. Specifically, it is determined (unit; % by weight) by measurement of dissolved polymer amount by pH titration, after charging 1 g of the water-absorbent resin in 200 g of the 0.9% by weight sodium chloride aqueous solution and stirring for 16 hours.

(i) "FSC" (ERT440. 2-02)

"FSC" is an abbreviation of Free Swell Capacity. Specifically, it is specified by absorbency (unit; g/g) by immersing 0.200 g of the water-absorbent resin in nonwoven fabric into a 0.9% by weight sodium chloride aqueous solution for 30 minutes, and then measuring without draining by a centrifugal separating machine.

(j) "Residual Monomers" (ERT410.2-02)

"Residual Monomers" mean amount of monomers remaining in the water-absorbent resin. Specifically, it is determined (unit; ppm) by charging 1.0 g of the water-absorbent resin in 200 $cm^3$ of 0.9% by weight sodium chloride aqueous solution, and after stirring for 1 hour under 500 rpm, by measuring amount of monomers eluted in said aqueous solution with a high performance liquid chromatography.

(k) "Particle Size Distribution" (ERT420.2-02)

"Particle size distribution" may be determined by sieve classification.

(l) Liquid Permeation

"Liquid permeation" means a degree of flowing of liquid flowing among swollen gel particles under pressure or non-pressure. As a typical measurement method thereof, there is "SFC (Saline Flow Conductivity)" and "GBP (gel Bed Permeability)". SFC is liquid permeation of 0.69% saline to 0.9 g of the water-absorbent resin under a load of 21 $g/cm^2$ (0.3 psi), and determined by a method described in U.S. Pat. No. 5,669,894 specification. GBP under a load or free swelling is determined by a method described in WO 2005/016393 pamphlet.

(m) Other Properties

Properties of the water-absorbent resin and the like other than the above may be determined in accordance with measurement methods in the following ERT original (revised in 2002).

pH (ERT400.2-02)
Moisture Content (ERT430.2-2)
Flow Rate (ERT450.2-02)
Density (ERT460.2-02)
Respirable Particles (ERT480.2-02)
Dust (ERT490.2-02)

<2> A Production Method for the Water-Absorbent Resin (1) Polymerization Step

In the production method for the water-absorbent resin of the present aspect, firstly a polymerization step is performed to obtain hydrogel by subjecting a monomer aqueous solution to a polymerization reaction.

(1-1) A Monomer Aqueous Solution

A monomer aqueous solution essentially includes a monomer, and may include other additives, as needed. Explanation will be given below in detail on each component included in the monomer aqueous solution.

(a) Monomer

A monomer in the present aspect is not especially limited, as long as it is a monomer including a polymerizable unsaturated bond (unsaturated monomer), however, in view of little coloring or property of the water-absorbent resin, use of acrylic acid and/or a neutralized substance thereof (that is, acrylic acid (salt)), as a main component, is preferable.

In the case of using acrylic acid (salt) as the monomer, in view of little coloring (color stability effect) or decrease in a residual monomer, in the water-absorbent resin, acrylic acid having low content of protoanemonin and/or furfural, which are impurities, are preferably used as raw materials. Specifically, content of protoanemonin and/or furfural in acrylic acid is preferably 0 to 10 ppm by weight, more preferably 0 to 5 ppm by weight, still more preferably 0 to 1 ppm by weight or less.

In addition, in view of little coloring (color stability effect) or decrease in a residual monomer, in the water-absorbent resin, the same as above, it is preferable that aldehyde other than furfural and/or maleic acid included in acrylic acid are preferably as low as possible. Specifically, content of aldehyde other than furfural and/or maleic acid in acrylic acid is preferably 0 to 5 ppm by weight, more preferably 0 to 3 ppm by weight, still more preferably 0 to 1 ppm by weight, particularly preferably 0 ppm by weight (detection limit or lower). It should be noted that as aldehyde other than furfural, benzaldehyde, acrolein, acetaldehyde or the like is included.

In addition, in view of decrease in a residual monomer in the water-absorbent resin, amount of dimer included in acrylic acid is also preferably as low as possible. Specifically, content of dimer in acrylic acid is preferably 0 to 500 ppm by weight, more preferably 0 to 200 ppm by weight, still more preferably 0 to 100 ppm by weight.

An acrylic acid to be used in the present aspect is not especially limited, and it may be, for example, acrylic acid obtained by vapor phase oxidation of propylene or propane as a raw material, or may be acrylic acid derived from a non-fossil raw material by oxidation of glycerin or the like obtained by natural fat. Further, acrylic acid may be obtained by direct oxidation of these raw material compounds, or acrylic acid may be obtained via acrolein as an intermediate substance and then oxidizing this.

It should be noted that the production method for acrylic acid from the non-fossil raw material has been described in WO 2006/08024 pamphlet, US-A-2007/0129570 specification, WO 2007/119528 pamphlet, WO 2007/132926 pamphlet, or the like. In addition, as for the production method for the water-absorbent resin using acrylic acid derived from the non-fossil raw material has been described, for example, in WO 2006/092273 pamphlet, WO 2006/136336, WO 2008/02304 pamphlet and WO 2007/109128 pamphlet, or the like.

In producing a salt of acrylic acid, as a basic substance to be used in neutralization of acrylic acid, there is included, for example, an alkali metal hydroxide such as sodium hydroxide, potassium hydroxide, lithium hydroxide, or a monovalent base of a (hydrogen) carbonate such as sodium (hydrogen) carbonate, potassium (hydrogen) carbonate, and among these, sodium hydroxide is preferably used.

In the case of using acrylic acid (salt) as a monomer, said acrylic acid (salt) may be a form composed of only acrylic acid, or may be a form of a mixture of acrylic acid and a salt of acrylic acid where acrylic acid is neutralized partially, or may be a form composed of only a salt of acrylic acid where all of acrylic acid is neutralized. In view of productivity of the water-absorbent resin, or enhancement of absorbency against pressure (AAP), saline flow conductivity (SFC) or the like, it is preferable that at least a part of acrylic acid is neutralized (including a salt of acrylic acid). Ratio of a salt of acrylic acid relative to total amount of the acrylic acid (salt) (neutralization rate of acrylic acid) is preferably 10 to 100% by mole, more preferably 30 to 95% by mole, still more preferably 50 to 90% by mole, particularly preferably 60 to 80% by mole.

Neutralization of acrylic acid may be performed in a state of acrylic acid or an aqueous solution of acrylic acid. Temperature in neutralization is not especially limited, and is determined as appropriate from 10 to 100° C., or 30 to 90° C. It should be noted that as for a method for neutralization of acrylic acid, a method described in WO 2006/109842 pamphlet or U.S. Pat. No. 6,388,000 specification may be adopted suitably.

It should be noted that as a method other than neutralization of acrylic acid as a monomer, an acid group of a polymer obtained in a polymerization step to be described later may be neutralized. It should be noted that the neutralization rate of the acid group in the polymer in that case is preferably 10 to 100% by mole, more preferably 30 to 95% by mole, still more preferably 50 to 90% by mole, particularly preferably 60 to 80% by mole.

In addition, in the present aspect, a hydrophilic or hydrophobic monomer other than acrylic acid (salt) (hereafter may also be referred to as "other monomers") may be used as a monomer. These other monomers include, for example, methacrylic acid, (maleic anhydride) or maleic acid, 2-(meth)acrylamido-2-methylpropane sulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl(meth)acrylamide, 2-hydrokyethyl(meth)acrylate, methoxy polyethylene glycol (meth)acrylate, polyethylene glycol(meth)acrylate, and stearyl acrylate, and a salt thereof.

Concentration of a monomer in the monomer aqueous solution (solid content concentration) is usually 10 to 90% by weight, preferably 20 to 80% by weight, more preferably 30 to 70% by weight, still more preferably 40 to 60% by weight. It should be noted that polymerization concentration may be over saturation concentration and thus the monomer aqueous solution may be slurry (aqueous dispersion solution), however, in view of property, it is preferable to be the aqueous solution without precipitation, by controlling at saturation concentration or lower.

(b) Internal Cross-Linking Agent

It is preferable that the monomer aqueous solution in the present aspect further includes an internal cross-linking agent, in view of enhancement of water-absorbing characteristics of the water-absorbent resin.

The inner cross-linking agent is not especially limited, and such one may be used: a polymerizable cross-linking agent having two or more polymerizable unsaturated groups in a molecule; or a reactive cross-linking agent having two or more reactive functional groups in a molecule, which is capable of forming a covalent bond or an ionic bond by reacting with a carboxylic group; or a cross-linking agent having both the polymerizable unsaturated group and the reactive functional group. Specifically, the polymerizable cross-linking agent includes N,N'-methylenebisacrylamide, (poly) ethylene glycol di(meth)acrylate, (polyoxyethylene) trimethylolpropane tri(meth)acrylate, poly(meth)allyoxy alkane, or the like. In addition, as the reactive cross-linking agent, there is included a covalent cross-linking agent such as polyglycidyl ether (for example, ethylene glycol diglycidyl ether), polyol (for example, propane diol, glycerin, sorbitol), and an ion binding cross-linking agent such as polyvalent metal compound including aluminum. Among these cross-linking agents, in view of enhancement of water-absorbing characteristics of the water-absorbent resin, the acrylate-type, allyl-type or acrylamide-type polymerizable cross-linking agent is used suitably.

In view of property of the water-absorbent resin, addition amount of the cross-linking agent is preferably 0.001 to 5% by mole, and more preferably 0.005 to 2% by mole, still more preferably 0.01 to 1% by mole, particularly preferably 0.03 to 0.5% by mole, relative to total amount of the monomer (excluding the cross-linking agent).

(c) Polymerization Inhibitor

It is preferable that the monomer aqueous solution in the present aspect further includes a polymerization inhibitor, in view of polymerization stability. As the polymerization inhibitor, for example, methoxyphenols are included, and among them use of p-methoxyphenol is preferable. Amount of the addition of the polymerization inhibitor is preferably 1 to 250 ppm, more preferably 5 to 200 ppm, still more preferably 10 to 160 ppm, particularly preferably 20 to 100 ppm, relative to the monomer. The addition amount of the polymerization inhibitor over 250 ppm causes a problem of polymerization speed or coloring (in particular, initial coloring), while the addition amount of the polymerization inhibitor below 1 ppm provides inferior polymerization stability and thus not preferable.

(d) Iron

The monomer aqueous solution in the present aspect may further include iron. Said iron is present in an ion form in the monomer aqueous solution. Content of iron, as converted value to $Fe_2O_3$, relative to the monomer, is usually 0 to 10 ppm by weight, preferably 0 to 5 ppm by weight, more preferably over 0 and below 5 ppm by weight, still more preferably 0.001 to 5 ppm by weight, particularly preferably 0.001 to 4 ppm by weight, most preferably 0.005 to 3 ppm by weight. As a control method for content of iron, a method disclosed in WO 2006/109842 pamphlet may be adopted.

It should be noted that conversion to $Fe_2O_3$ represents Fe amount in a compound containing iron (for example $Fe_2O_3$ or an iron salt thereof, iron hydroxide, iron complex thereof or the like) or Fe amount as single iron, as amount of an iron compound represented by $Fe_2O_3$ (molecular weight of 159.7), and amount of iron as the Fe part can be calculated unambiguously by $55.85 \times 2/159.7$ (Fe in $Fe_2O_3$).

The content of iron, as converted to $Fe_2O_3$, of 10 ppm by weight (as Fe, 10 ppm$\times 55.85 \times 2/159.7$=7.0 ppm) or lower is capable of preventing coloring of the water-absorbent resin. In addition, the lower content of iron is generally the better, however, even setting at N.D (detection limit or lower; 0 ppm) sometimes may not give effect comparable to cost, or may decrease polymerization rate in redox polymerization or the like, on the contrary.

It should be noted that the content of iron in the monomer aqueous solution can be measured by an ICP emission spectrometry described, for example, in JIS K1200-6. Said ICP emission spectrometer is sold as ULTIMA, manufactured by Horiba Ltd., or the like.

(e) Other Components

The monomer aqueous solution may include water-soluble resins or water-absorbent resins such as starch, cellulose, polyvinyl alcohol, polyacrylic acid (salt), polyethylenimine, other than the components. These water-soluble resins or water-absorbent resins may be added in a ratio of, for example, 0 to 50% by weight, preferably 0 to 20% by weight, more preferably 0 to 10% by weight, still more preferably 0 to 3% by weight, relative to total amount of the monomer. It should be noted that a graft polymer or a water-absorbent resin composition obtained by using other components (for example, a starch-acrylic acid graft polymer) is also generically called a polyacrylic acid (salt)-type water-absorbent resin in the present invention. In addition, various properties of the water-absorbent resin may be improved by adding various foaming agents (a carbonate salt, an azo compound, air bubbles or the like), surfactants or various additives other than these and the like, in an amount of, for example, 0 to 5% by weight, preferably 0 to 1% by weight.

As the various additives, for example, a chelating agent, hydroxy carboxylic acid, a reductive inorganic salt and the like are included. Among these, it is preferable to use the chelating agent. In the case of using the chelating agent, hydroxy carboxylic acid, or the reductive inorganic salt, they are added so as to attain preferably 10 to 5000 ppm by weight, more preferably 10 to 1000 ppm by weight, still more preferably 50 to 1000 ppm by weight, particularly preferably 100 to 1000 ppm by weight, relative to the water-absorbent resin.

By using these chelating agent, hydroxy carboxylic acid, and the reductive inorganic salt, little time course coloring, or enhancement of urine resistance (prevention of gelling deterioration) in the water-absorbent resin can be attained. It should be noted that, as a typical compound of the chelating agent, hydroxy carboxylic acid, and the reductive inorganic salt, a compound described in WO 2009/005114 pamphlet, EP-A-2057228 description, EP-A-1848758 description may be used suitably.

It should be noted that the components of the above (b) to (e), excluding a monomer, may be added, as described above, into the monomer aqueous solution, however, it may be added in an arbitrary stage in the production method for the water-absorbent resin of the present aspect. For example, it may be added to a reaction solution during a polymerization reaction, hydrogel after the polymerization reaction, a dried substance obtained by drying hydrogel, and powder obtained by pulverization of the dried substance.

(2) Polymerization Reaction (Cross-Linking Polymerization Reaction)

As the polymerization reaction in the polymerization step of the present aspect, aqueous solution polymerization or reversed phase suspension polymerization is usually adopted, in view of performance of the water-absorbent resin or easiness of control of the polymerization reaction. Among these, aqueous solution polymerization is preferable, and continuous aqueous solution polymerization is more preferable.

As a preferable aspect, continuous aqueous solution polymerization may be adopted, which produces the water-absorbent resin by a giant scale per line, such as 0.5 t/hr or more, more preferably 1 t/hr or more, still more preferably 5 t/hr or more, and particularly preferably 10 t/hr or more. As specific continuous aqueous solution polymerization, there are included continuous kneader polymerization (for example, in U.S. Pat. No. 6,987,151 specification, and U.S. Pat. No. 670,141 specification), and continuous belt polymerization (for example, in U.S. Pat. No. 4,893,999 specification, U.S. Pat. No. 6,241,928 and US-A-2005-215734 specification).

In the polymerization reaction of the present aspect, initiation temperature of the continuous aqueous solution polymerization is preferably high temperature. Specifically, it is preferable that temperature of the monomer aqueous solution is controlled at preferably 30° C. or higher, more preferably 35° C. or higher, still more preferably 40° C. or higher, and particularly preferably 50° C. or higher (the upper limit is boiling point). In addition, it is preferable that monomer concentration is high. Specifically, it is preferable that monomer concentration in the reaction solution is controlled at preferably 35% by weight or higher, more preferably 40% by weight or higher, still more 45% by weight or higher (however, the upper limit is saturated concentration).

According to the production method of the present aspect, because the water-absorbent resin with superior stability of a monomer and less coloring can be obtained even in polymerization under such high concentration or high temperature, effect is exerted still more significantly under such condition. Such polymerization initiated at high temperature has been exemplified in U.S. Pat. No. 6,906,159 specification and U.S. Pat. No. 7,091,253 specification, however, according to the production method of the present aspect, also stability of a monomer before polymerization is excellent, and thus production in an industrial scale is easy.

The above polymerization reaction can be performed even under air atmosphere, however, in view of reduction of coloring of the water-absorbent resin, it is preferable to be performed under inert gas atmosphere such as nitrogen or argon (for example, under an oxygen concentration of 1% by volume or lower). In addition, it is preferable that a monomer or the monomer aqueous solution is used in the polymerization reaction after dissolved oxygen is sufficiently replaced with inert gas (for example, to an oxygen concentration below 1 ppm). Even by such deaeration, stability of the monomer is excellent, gelling before polymerization seldom generates, and the water-absorbent resin having higher property and higher whiteness can be provided.

A polymerization initiator to be used in the polymerization step of the present aspect may be selected as appropriate depending on polymerization form. As the polymerization initiator, for example, there is included a photodegradable-type polymerization initiator, a thermal decomposition-type polymerization initiator, a redox-type polymerization initiator or the like.

As a photodegradable-type polymerization initiator, for example, there is included a benzoin derivative, a benzyl derivative, an acetophenone derivative, a benzophenone derivative, an azo compound or the like. In addition, as a thermal decomposition-type polymerization initiator, for example, there is included a persulfate salt (sodium persulfate, potassium persulfate, ammonium persulfate), a peroxide (hydrogen peroxide, t-butyl peroxide, methyl ethyl ketone peroxide); an azo compound (2,2'-azobis(2-amidinopropane) dihydrochloride, 2,2'-azobis[2-(2-imidazoline-2-yl)propane] dihydrochloride or the like) or the like. In addition, the persulfate salt, the peroxide, and the azo compound can be used as a photopolymerization initiator.

As the redox-type polymerization initiator, for example, a combined system of the persulfate salt or the peroxide with a reducing compound such as L-ascorbic acid or sodium hydrogen sulfite, may be included. In addition, combined use of the photodegradable-type initiator and the thermal decomposition-type polymerization initiator is also included as a preferable aspect.

Use amount of the polymerization initiator is preferably 0.0001 to 1% by mole, and more preferably 0.001 to 0.5% by mole, relative to total amount of the monomer. The use amount of the polymerization initiator of 1% by mole or lower is capable of suppressing coloring of the water-absorbent resin. In addition, the use amount of the polymerization initiator of 0.0001% by mole or higher is capable of reducing the residual monomer. It should be noted that, although a method for using a conventional coloring improvement agent provided adverse influence on polymerization in some cases, according to the production method of the present aspect, there is no adverse influence on the polymerization reaction or various properties of the water-absorbent resin and coloring can be reduced.

(Step for Fine Granulation)

The hydrogel-like polymer obtained in the above polymerization step (hereafter, it may be referred to simply as "hydrogel") may be supplied to a drying step as it is, however, after the polymerization step and also before the drying step, it is finely granulated to make a particulate state, using a crushing machine (a kneader, a meat chopper, or the like), as needed. It should be noted that in the case where a polymerization reaction in the polymerization step is reversed phase suspension polymerization, because hydrogel is finely granulated by dispersion in a solvent during polymerization, the finely granulation step may not be required in some cases.

Temperature of the hydrogel in fine granulation is controlled, in view of property of the water-absorbent resin, by warming or heating so as to attain a range of preferably 40 to 95° C., more preferably 50 to 80° C. In addition, solid content of the hydrogel in this case is, in view of property, preferably 10 to 70% by weight, more preferably 15 to 65% by weight, still more preferably 30 to 55% by weight. It should be noted that, in said fine granulation step, there may be added water, a surfactant, a polyol, a mixed solution of water and the polyol, a solution where a polyvalent metal is dissolved in water, or steam thereof to enhance pulverization efficiency, as needed.

Weight average particle diameter (specified by sieve classification) of hydrogel fine granulated (hereafter it may also be referred to as "particulate hydrogel") is preferably 0.5 to 4 mm, more preferably 0.3 to 3 mm, still more 0.5 to 2 mm. In addition, it is preferable that particles of particulate hydrogel with a particle diameter of 5 mm or larger is preferably 0 to 10% by weight or less, more preferably 0 to 5% by weight, relative to total weight of the particulate hydrogel. In addition, it is preferable that at least a part of, preferably 1 to 50% by weight of the particulate hydrogel is smaller than a pore of a through-flow belt to be described later. By controlling particle diameter of the particulate hydrogel within the above range, a subsequent drying step can be performed efficiently. It should be noted that particle diameter of the particulate hydrogel is determined by classification using a sieve with a specific sieve mesh size, similarly as in particle diameter of the water-absorbent resin after pulverization to be described later. In addition, as for weight average particle diameter of the particulate hydrogel as well may be determined similarly as in weight average particle diameter (D50) to be described later. However, a classification operation of the above particular hydrogel is difficult by a dry-system, therefore a wet-type classification method is used, which is described in JP-A-2000-63527, paragraph "0091".

(4) Drying Step

The production method for the water-absorbent resin of the present aspect has characteristics in the drying step of hydrogel. That is, the present inventors have found that by setting pore opening rate of the through-flow belt at 20 to 50% and area occupancy rate of the hydrogel at 85 to 100%, relative to the through-flow belt, in drying hydrogel having high solid content (essentially 35% by weight or higher, preferably 40% by weight or higher, and still more preferably 45% by weight or higher), using a continuous through-flow belt-type drying machine, such a water-absorbent resin can be obtained efficiently that suppresses generation of the undried substance to the minimum, has property equivalent to or higher than that of a conventional water-absorbent resin, and has little coloring, and have thus completed the present invention. Explanation will be given below in detail on the present drying step.

(a) Solid Content of Hydrogel

Solid content of hydrogel to be supplied to the present drying step is essentially 35% by weight or higher, preferably 40% by weight or higher, more preferably 45% by weight or higher, still more preferably 50% by weight or higher, particularly preferably 55% by weight or higher. Upper limit of the solid content is not especially limited, however, it is preferably 80% by weight or lower, more preferably 75% by weight or lower, still more preferably 70% by weight or lower. The solid content of lower than 35% by weight may decrease productivity in some cases. In addition, excessively high solid content may decrease property such as absorbency in some cases. Adjustment of the solid content can be performed by adjustment of concentration of a monomer in polymerization, or evaporation amount of water or the like during polymerization. Further, solid content may be controlled by adding the fine powder obtained by a pulverization step or a classification step to be described later, or the one added with water to said fine powder, during polymerization or after polymerization, as needed.

(b) Drying Apparatus

In the present aspect, a continuous through-flow belt-type drying machine is used for drying of hydrogel. The continuous through-flow belt-type drying machine may be the one composed of a single belt, or may be the one composed of a plurality of belts. In addition, the continuous through-flow belt-type drying machine may be a single apparatus, or may be formed as a multi-stage apparatus by combination of apparatuses of other steps.

Length of the through-flow belt in the through-flow belt-type drying machine is not especially limited, however, it is preferably 5 to 100 m, more preferably 10 to 70 m, still more preferably 20 to 60 m. In addition, width of the through-flow belt is also not especially limited, however, it is preferably 0.5 to 10 m, more preferably 1 to 5 m. It should be noted that ratio of length of the through-flow belt to width thereof is preferably 3 to 500 times, more preferably 5 to 100 times. In the drying step of the present aspect, by using such a large scale continuous through-flow belt-type drying machine, the water-absorbent resin having excellent property can be produced efficiently.

The through-flow belt is preferably the one made of a metal screen (for example, having a sieve mesh size of 1000 to 45 μm) or a punching metal (perforated metal plate), and more preferably the one made of the punching metal. Shape of a hole of the punching metal is not especially limited, and includes, for example, round shape, elliptic shape, square shape, hexagonal shape, long circle, siliqua, diamond shape and cross shape, and combinations thereof. Arrangement of pores is also not especially limited, and it may be staggered-like or parallel-like. Further, the pore may be formed flatly, or may be formed sterically like a louver (bay window) or the like, however, the pore formed flat-like is preferable. In addition, a pitch direction may be any of longitudinal, lateral or oblique one, relative to a travelling direction of a belt, or may be a combination thereof.

In addition, the through-flow belt may be the one treated by the predetermined surface treatment such as electropolishing or Teflon® treatment. A material in using the punching metal as the through-flow belt is preferably stainless steel, and the thickness is determined as appropriate at usually 0.3 to 10 mm, preferably 1 to 5 mm.

Surface roughness (Rz) (JIS B 0601-2001) of the belt surface is usually 800 nm or less, preferably 500 nm or less, more preferably 300 nm or less, still more preferably 200 nm or less, particularly preferably 185 nm or less, most preferably 170 nm or less. Lower limit of the surface roughness (Rz) is not especially limited, however, it is enough to be 10 nm, still more about 20 nm. In addition, surface roughness (Ra) (JIS B 0601-2001) is preferably 250 nm or less, more preferably 200 nm or less. These surface roughnesses can be measured in accordance with JIS B 065-2001, using a surface roughness tester by stylus method.

Transfer speed of the through-flow belt in the continuous through-flow belt-type drying machine can be adjusted as appropriate in response to belt width or belt length, and drying time or production amount of the water-absorbent resin, however, in view of load or durability of a belt driving apparatus or the like, it is preferably 0.3 to 5 m/min, more preferably 0.5 to 2.5 m/min, still more preferably 0.5 to 2 m/min, particularly preferably 0.7 to 1.5 m/min.

In the drying step of the present aspect, it is preferable that drying is performed by changing drying condition (temperature, dew point, through-flow rate) in multistep, and therefore it is preferable to use the through-flow belt-type drying machine having 5 or more drying rooms, still more 6 or more drying rooms, particularly 8 or more drying rooms. It should be noted that, in view of a scale or the like, upper limit thereof is usually about 20 rooms.

(c) Pore Opening Rate of the Through-Flow Belt

In the present aspect, pore opening rate of the through-flow belt is specified by ratio (percentage) of pore area to total area of the through-flow belt (including pore area). Pore opening rate is determined by area, number, and arrangement (pitch) or the like of the pore, however, even in the case where the pore is absent at a certain region of the through-flow belt (for example, a pool part of the through-flow belt), it is determined by total area of the through-flow belt including the region not having said pore. Said pore opening rate is essentially 20 to 50%, preferably 20 to 45%, more preferably 25 to 40%. The pore opening rate outside the above range may decrease property of the water-absorbent resin, or decrease drying efficiency or the like in some cases.

(d) Pore Area of the Through-Flow Belt or the Like

In addition, in the present aspect, it is preferable that pore area of the through-flow belt is larger than cross-sectional area of one particle of hydrogel to be supplied to drying, more preferably it is 2 to 100 times, still more preferably 4 to 50 times said cross-sectional area.

In addition, maximum pore opening distance (the longest one among distances between arbitrary two points at the pore periphery) is preferably larger than weigh average particle diameter of hydrogel, and it is more preferably 2 to 100 times, still more preferably 4 to 50 times said weight average particle diameter.

Further, average area per one pore is preferably 5 to 500 mm$^2$, more preferably 10 to 100 mm$^2$, still more preferably 15 to 50 mm$^2$. The average area per pore of 5 mm$^2$ or larger provides superior drying efficiency. On the other hand, the average area of pore of smaller than 500 mm$^2$ makes dropping of dried hydrogel from the pore difficult, thus enables to prevent decrease in yield.

In the drying step of the present aspect, by setting pore opening rate, maximum pore opening distance and average pore area of the through-flow belt within the above range, both of drying efficiency and property of the water-absorbent resin can be enhanced. In more specifically, remaining of the undried substance or dissipation of the dried substance can be prevented, as well as decrease in water-absorbing property or coloring of the water-absorbent resin can be suppressed. It should be noted that, in a conventional drying method, hydrogel (for example, 1 to 2 mm) had been dried on a metal screen (for example, having a sieve mesh size of 300 μm), however, in the drying step of the present aspect, it is preferable to use the through-flow belt having a pore larger than that of a conventional one.

(e) Area Occupancy Rate and Width Occupancy Rate

"Area occupancy rate" in the present description means rate (percentage) of area occupying the through-flow belt by hydrogel before drying, loaded on the through-flow belt, relative to area of the through-flow belt. Specifically, it is specified by area of the through-flow belt from a point where loading of hydrogel on the through-flow belt is completed to a point progressing in a travelling direction by 1 minute, preferably by 0.5 minute, more preferably by 0.1 minute. It should be noted that area occupancy rate in Examples to be described later is a value measured as for area from a point where loading of hydrogel on the through-flow belt is completed to a point progressing in a travelling direction by 0.1 minute. Said area is determined as appropriate by speed of the through-flow belt, however, in the case where speed of the through-flow belt is 1 [m/min], it becomes area from the point where loading of hydrogel on the through-flow belt is completed to 1 m, preferably 0.5 m, most preferably 0.1 m. Provided that area of said through-flow belt is (A) and occupying area of hydrogel loaded on this area is (B), the area occupancy rate is represented by the (B/A)×100 [%].

It should be noted that "the point where loading of hydrogel on the through-flow belt is completed" indicates the point where loading is completed in a travelling direction, when loading is viewed in a width direction of the belt, and, for example, in the case where loading of hydrogel progresses in a state of drawing an arc or a wave in a width direction, it is specified, for example, by the most front end part of the travelling direction of hydrogel.

In the drying step of the present aspect, said area occupancy rate is preferably 85 to 100%, more preferably 87 to 100%, still more preferably 87 to 99%, particularly preferably 90 to 98%, most preferably 93 to 97%. Said area occupancy rate outside the range may decrease property of the water-absorbent resin, or decrease drying efficiency in some cases. The area occupancy rate below 100% means that hydrogel is not loaded on at least a part of the through-flow belt. Although a portion where hydrogel is not loaded may be present at any portion on the through-flow belt, it is preferable that a constant region, where hydrogel is not loaded, is set at the both end parts of the through-flow belt.

By the similar effect and reason as above, in the drying step of the present aspect, said width occupancy rate is preferably 85 to 100%, more preferably 87 to 100%, still more preferably 87 to 99%, particularly preferably 90 to 98%, most preferably 93 to 97%. In the present description, "width occupancy rate" means rate (percentage) of width occupying the through-flow belt by hydrogel before drying, loaded on the through-flow belt, relative to cross-section of the through-flow belt. Specifically, it is specified by occupation rate of the through-flow belt in a width direction by hydrogel, at a point where loading of hydrogel on the through-flow belt is completed. Here, the area occupancy rate and the width occupancy rate are mutually exchangeable, because they become the same range when averaged for a long period of time.

In addition, in the case where the occupied area or the occupied width by hydrogel on the through-flow belt changes periodically (for example, a wave is drawn in a travelling direction), the area occupancy rate or the width occupancy rate is evaluated by average value in said period. Therefore, the case where area occupancy rate or the width occupancy rate is outside the above range in a part of section of the period or change, may be included. However, it is preferable, without saying, that area occupancy rate is included within the above range throughout the whole of said period on the through-flow belt. Specifically, it is preferable that a section where area occupancy rate or the width occupancy rate is included within the above range, in one period or throughout a continuous drying period, is preferably 60% or more, more preferably 75% or more, still more preferably 90% or more, particularly preferably 100%, relative to the whole through-flow belt. That is, it is preferable that average area and/or the width occupancy rate in one period or throughout a continuous drying period satisfy the range.

(f) Thickness of Hydrogel

In the drying step of present aspect, it is preferable to dry hydrogel, by providing change in thickness of hydrogel loaded onto the through-flow belt. Specifically, it is preferable that thickness variation rate (1), represented by the following EXPRESSION 1, is specified within a predetermined range.

[MATH. 1]

Thickness variation rate (1)=(Maximum thickness of hydrogel in a width direction of the through-flow belt)/(average thickness of hydrogel in a width direction of the through-flow belt)   [EXPRESSION 1]

Figure 1B:
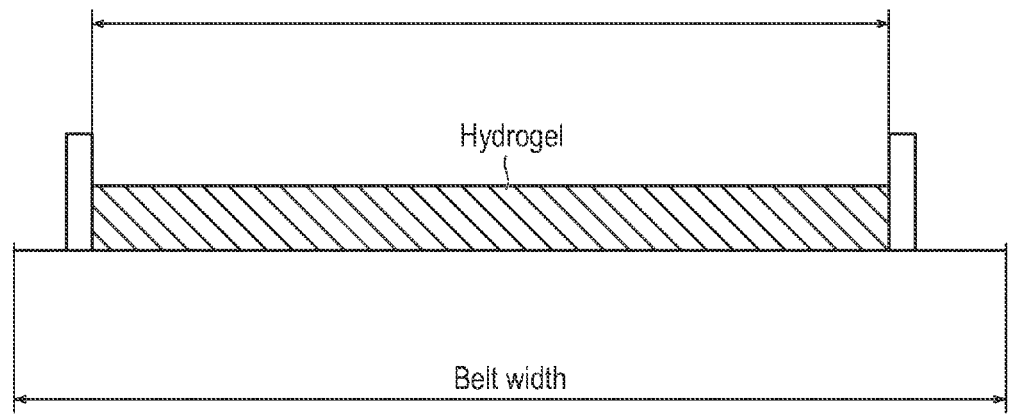
FIG. 1b is a cross-sectional view a continuous through-flow belt-type drying machine in a travelling direction, and a conceptual diagram where thickness of hydrogel is made constant (thickness).

In the EXPRESSION 1, "thickness in a width direction" means thickness of gel at the cross-section cut in a vertical direction (for example, FIG. 1a, FIG. 1b) to the travelling direction of the through-flow belt servicing continuously, at the point where loading of hydrogel is completed, and it can be measured using, for example, a laser-type distance meter or a laser-type displacement meter. It should be noted that "thickness of hydrogel" does not mean thickness of one particle of hydrogel but means thickness as an aggregate composed of hydrogel particles loaded. "Maximum thickness in a width direction" means maximum value in measurement of thickness in a width direction continuously or by each 10 cm from the center of the through-flow belt (for example, 21 places at most, in the case of the through-flow belt with a width of 2 m). In addition, "average thickness in a width direction" means average value of thickness measured in a width direction, continuously or by each 10 cm from the center of the through-flow belt (for example, 21 places at most, in the case of the through-flow belt with a width of 2 m).

In the present aspect, it is preferable that the above thickness variation rate (1) is set at 1.05 to 5.00. The lower limit of said thickness variation rate (1) is preferably 1.10 or more, more preferably 1.15 or more, still more preferably 1.20 or more, particularly preferably 1.25 or more, most preferably 1.30 or more. In addition, the upper limit is preferably 2.00 or less, more preferably 1.80 or less, still more preferably 1.60 or less, particularly preferably 1.50 or less. A numerical range of the thickness variation rate (1) is preferably 1.10 to 3.00, more preferably 1.15 to 2.00, still more preferably 1.20 to 1.80, particularly preferably 1.25 to 1.60, most preferably 1.30 to 1.50.

In addition, it is preferable that, in the drying step of the present aspect, thickness variation rate (2) in a width direction of the through-flow belt is set at 1.05 to 3.00.

Thickness variation rate (2) is specified by the following EXPRESSION 2.

[MATH. 2]

Thickness variation rate (2)=(Maximum thickness of hydrogel at the both end parts of the through-flow belt)/(Maximum thickness of hydrogel at the center part of the through-flow belt)   [EXPRESSION 2]

In the above EXPRESSION 2, "the both end parts of the through-flow belt" means a portion of a width of ⅓ relative to the whole width of the through-flow belt, from each of the both ends of the through-flow belt. "Maximum thickness at the both end parts" means maximum value in measurement at a place where height becomes maximum at the both end parts (⅓ at the left side and the right side). The maximum value among the two both end parts may be present at any of the both end parts. In addition, "the center part of the through-flow belt" means a portion other than the both end parts. "Maximum thickness at the center part" means maximum value in measurement at a place where height becomes maximum at the center part (⅓ at the center part).

In the present aspect, it is preferable that the thickness variation rate (2) is set at 1.05 to 3.00. The lower limit of said thickness variation rate (2) is preferably 1.10 or more, more preferably 1.15 or more, still more preferably 1.20 or more, particularly preferably 1.25 or more, most preferably 1.30 or more. In addition, the upper limit is preferably 2.00 or less, more preferably 1.80 or less, still more preferably 1.60 or less, particularly preferably 1.50 or less. A numerical range of the thickness variation rate (2) is preferably 1.10 to 3.00, more preferably 1.15 to 2.00, still more preferably 1.20 to 1.80, particularly preferably 1.25 to 1.60, most preferably 1.30 to 1.50.

It is preferable that thickness of hydrogel changes symmetrically from the center point in a width direction of the through-flow belt toward the both ends. In addition, it is preferable that "maximum thickness at the both end parts" is present in at least one side of the two parts at a width of ⅙, relative to the total width of the through-flow belt, from each of the both ends of the through-flow belt.

In a drying step in a conventional production method for the water-absorbent resin, to enhance property such as absorbency or extractables of the water-absorbent resin, a method for controlling thickness of hydrogel uniformly relative to a width direction of the through-flow belt (U.S. Pat. No. 6,241, 928 specification) has been adopted. In addition, in order to control thickness of hydrogel on the through-flow belt uniformly, a drying method for using a gel leveling machine such as a roller (the PATENT LITERATURE 17), or a method for carrying gel using a roller on the continuous through-flow belt-type drying machine (the PATENT LITERATURES 4, 5) have also been adopted.

In such conventional technique, in particular, in the case where hydrogel with low solid content is dried, it has been said that by making thickness of hydrogel uniform, improvement of property of the water-absorbent resin or decrease in generation amount of the undried substance can be attained. However, in the case where hydrogel with high solid content is dried, it is difficult to satisfy both drying efficiency (amount of the undried substance or yield of the dried substance or the like) and property (CRC, extractables, residual monomer, coloring, AAP, SFC or the like) of the water-absorbent resin, and thus it has been impossible to attain desired property and high productivity.

In the present invention, contrary to a means of conventional technique, by changing thickness of hydrogel in a width direction, it becomes possible to dry hydrogel more uniformly, suppress generation of the undried substance, enhance property and decrease coloring.

In addition, in the present aspect, thickness in a travelling direction of the through-flow belt may be constant, or may be changed periodically or non-periodically. In the case where the thickness is changed in a travelling direction, a pattern (shape) or period thereof is not especially limited. In addition, in the case where the thickness is changed relative to a travelling direction, the thickness variation rate (1) and (2) in the width direction are specified by average value thereof. Therefore, in a certain section, there may be the case where the thickness variation rate (1) and (2) become outside the above range microscopically. However, when the thickness variation rate (1) and (2) are included within the above range throughout the whole through-flow belt, it is approved to be included in the drying step of the present aspect. Specifically, a section, where the thickness variation rate (1) and (2) are included in the above range, is preferably 60% or more, more preferably 75% or more, still more preferably 90% or more, particularly preferably 100%, relative to the whole through-flow belt.

Average value of thickness of hydrogel loaded on the through-flow belt is usually 1 to 30 cm, preferably 2 to 20 cm, more preferably 5 to 15 cm, still more preferably 7 to 13 cm. In addition, thickness of hydrogel loaded on the through-flow belt is usually 0 to 30 cm, preferably 5 to 20 cm, more preferably 8 to 15 cm, still more preferably 9 to 11 cm, and thus thickness may be changed within said range. By controlling average value of thickness of hydrogel, and thickness of hydrogel within the above range, drying efficiency or various properties of the water-absorbent resin can be enhanced, and in particular, bulk specific gravity of the water-absorbent resin can be controlled high.

A specific method for controlling area occupancy rate or thickness of hydrogel on the through-flow belt is not especially limited, however, for example, the following (1) to (4) and the like are included. These methods may be used in combination as appropriate.

(1) A method for adjusting feed amount of hydrogel relative to a width direction of the through-flow belt;
(2) A method for leveling gel supplied on the through-flow belt, using a control plate having constant shape (for example, wave-like, comb-like, jagged-like shape) in a width direction, or a roller;
(3) A method for supplying hydrogel on the through-flow belt from a plurality of places in a width direction (each supply amount may be changed);
(4) A method for supplying hydrogel on the through-flow belt by dividing in a plurality of portions;

In the above (1) to (4), as a method for supplying hydrogel onto a belt, there has been included a method for supplying hydrogel onto the through-flow belt directly from an exit of an apparatus of the polymerization step or the fine granulation step (for example, a kneader, a meat chopper); a method for using a feeder as disclosed in the PATENT LITERATURES 3, 18 to 20 or the like; or the like.

As an example of the above control means, a servomotor and an inverter motor of said apparatus are sequentially controlled using a traverse feeder or an oscillating feeder, as supplying apparatus of hydrogel. That is, it is preferable to operate peripheral speed of the traverse feeder or the oscillating feeder in non-constant velocity, and in that case, peripheral speed is increased from the center part toward the both ends, preferably by 1.1 times or more, still preferably by 1.3 to 20 times. By such a means, thickness of hydrogel can be controlled constant within the above range, and thus problems of the present invention are still more solved. Further, in supplying hydrogel from the supply apparatus to the through-flow belt, gap between the supply apparatus and the through-flow belt face is 20 to 80 cm, particularly preferably 30 to 50 cm, and supply by free falling from the supply apparatus to the through-flow belt is preferable. By controlling the traverse feeder or the oscillating feeder, preferably by controlling digitally (continuous ON-OFF, or periodic change of speed), area occupancy rate or thickness variation rate can be controlled within a predetermined range. It should be noted that control using the oscillating feeder has not been described in the PATENT LITERATURES 1 to 3. Although the traverse feeder or the oscillating feeder has been disclosed in the PATENT LITERATURE 2 (WO 2008/087114 pamphlet) or the PATENT LITERATURE 28 (US-A-2004/0234607 specification), peripheral speed thereof or speed change has not been disclosed nor suggested at all.

The present invention provides the production method for the water-absorbent resin, by loading and drying hydrogel on the through-flow belt, using the traverse feeder or the oscillating feeder, preferably operating in non-constant peripheral speed.

That is, the preferable production method for the water-absorbent resin of the present invention is the production method for the water-absorbent resin, including: a polymerization step for obtaining hydrogel by subjecting a monomer aqueous solution to a polymerization reaction; and a drying step for drying the hydrogel; wherein drying in the drying step is performed using the continuous through-flow belt-type drying machine; solid content of the hydrogel supplied to the drying step is 35% by weight or more, and is a production method for the water-absorbent resin by loading the hydrogel on the continuous through-flow belt-type drying machine, using the non-constant velocity traverse feeder (another name; head swing feeder) or the oscillating feeder (another name; oscillating conveyor), in particular, the traverse feeder.

Figure 2:
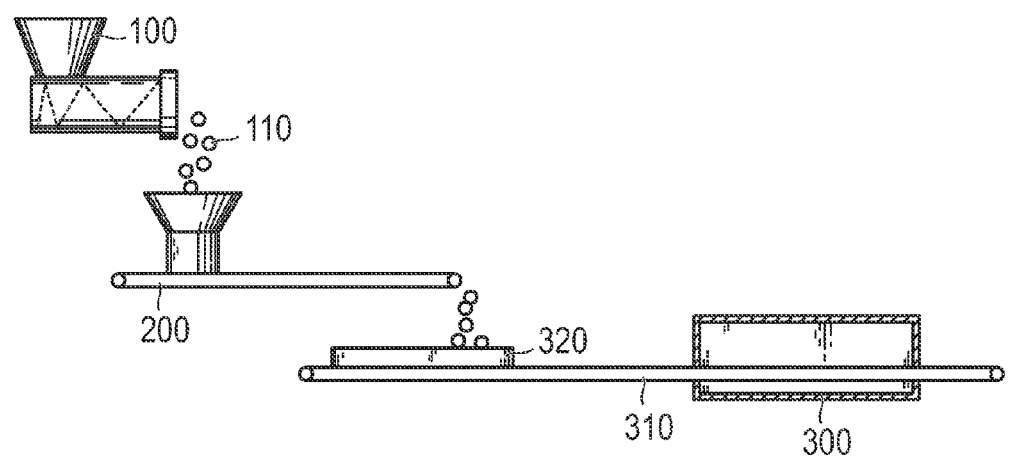
FIG. 2 is a conceptual diagram of a continuous through-flow belt-type drying machine equipped with non-constant velocity traverse feeder, followed by a gel fine granulation step (a meet chopper), when viewed from the side.
Figure 3:
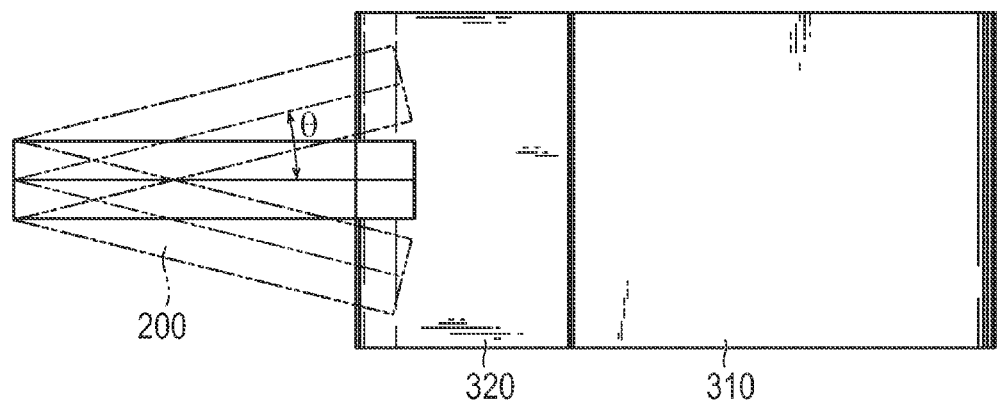
FIG. 3 is a conceptual diagram of a continuous through-flow belt-type drying machine equipped with non-constant velocity traverse feeder for controlling thickness, when viewed from the upper part.

In the present description, "the traverse feeder" indicates a feeder where position of the feeder itself varies, in particular, varies periodically, and still more circularly moves in a plane direction (for example, FIG. 3), and a typical traverse feeder or oscillating feeder is exemplified as 200 of FIG. 2 and FIG. 3. It has been exemplified also in the PATENT LITERATURE 2 (WO 2008/087114 pamphlet) or the PATENT LITERATURE 28 (US-A-2004/0234607 specification), however, it should not be limited thereto.

As a preferable embodiment of the present invention, the hydrogel is loaded on the continuous through-flow belt-type drying machine, using the non-constant velocity traverse feeder, particularly, the traverse belt feeder, and peripheral speed (m/sec) of the traverse feeder becomes higher speed at the both end parts than at the center part.

In the present invention, "non-constant velocity" indicates that speed of the traverse feeder for converting direction is in a state of acceleration or deceleration. That is, it indicates that said traverse feeder converts direction in constant period or angle θ (refer to FIG. 3), however, speed at other than the both ends thereof accelerates or decelerates in an analogue way or a digital way.

In order to solve the problem of the present invention, it is preferable that higher speed (peripheral speed; m/sec) is attained at the both end parts than at the center part (θ=0 degree) of head swing angle of said traverse feeder, by 1.1 to 100 times, still more 1.15 to 50 times, still further more 1.3 to 20 times, particularly 1.5 to 10 times. In the present description, it is preferable that the both end parts are specified, for example, by an angle of 45 degree from the center part, or a position narrowed by 10 degree from maximum head swing angle θ of the traverse feeder. By such a method, drying efficiency of the present invention is enhanced still more.

In operation of the traverse feeder in non-constant velocity, rotation speed of a conveyor belt (conveying speed of hydrogel) may be determined as appropriate, however, it is preferably 0.1 (m/s) or higher, more preferably 0.1 to 10 (m/s), still more preferably 0.4 to 8 (m/s). It should be noted that the rotation speed of the conveyor belt may be constant velocity or non-constant velocity, as long as it is within the above range, however, constant velocity is preferable. Still more, peripheral speed or angle (θ) of the traverse feeder may also be determined as appropriate. Preferably, it is controlled so as to attain the thickness variation rate or occupancy rate, and still more controlled so as to attain solid content, punching metal, drying condition, polymerization condition or the like described above or to be described later.

(g) Density of Hydrogel

In the drying step of the present aspect, density of hydrogel in a undried state, to be loaded on the through-flow belt is preferably below 0.7 g/cm$^3$, more preferably below 0.6 g/cm$^3$, still more preferably below 0.55 g/cm$^3$, and lower limit value thereof is preferably 0.35 g/cm$^3$ or higher. As a control method for density, a method for loading hydrogel onto the through-flow belt by dropping it from predetermined height is included. It should be noted that, in that case where gel after loaded is flattened using a roller or the like, as in the PATENT LITERATURE 18, control of density becomes difficult. Said density may be determined by calculation from weight of hydrogel loaded on the through-flow belt and volume of a loaded substance of particulate hydrogel, using scanning of a laser-type distance meter or a laser-type displacement sensor.

(h) Drying Temperature and Through-Flow Rate

Drying temperature in the continuous through-flow belt-type drying machine is set at preferably 110 to 230° C., more preferably 150 to 230° C., still more preferably 160 to 200° C. By setting the drying temperature at 110 to 230° C., shortening of drying time and reduction of coloring of the water-absorbent resin can be attained at the same time. It should be noted that drying temperature is specified by atmosphere temperature.

In addition, it is preferable that flow rate of hot air is set at 3.0 m/sec or lower. In addition, as for direction of hot air, it is preferable to combine up-flow and down-flow. In particular, by setting hot air direction to up-flow in the first part, and down-flow in the latter part, more uniform drying can be attained.

(i) Drying Time

Drying time may be adjusted as appropriate, by those skilled in the art, depending on surface area and water content of hydrogel, and type of the drying machine. Drying time is usually 10 to 120 minutes, preferably 20 to 60 minutes.

(j) Dew Point

In the drying step, air including steam or inert gas is contacted to hydrogel. It is preferable that dew point of said steam mixed gas is high at the inlet of the drying machine and low at the exit of the drying machine. Dew point of the steam mixed gas is preferably 50 to 100° C., more preferably 50 to 70° C. By controlling it within this range, a residual monomer can be reduced. Still more, in the drying step, in view of the residual monomer, water-absorbing characteristics or coloring, it is preferable that hot air with dew point higher by 10 to 50° C., more preferably 15 to 40° C. is contacted to hydrogel. By controlling it within this range, it becomes possible to reduce the residual monomer, enhance water-absorbing characteristics and suppress coloring. By controlling the dew point as above, decrease in density of the water-absorbent resin can be prevented as well.

In the present invention, it is preferable that, in the drying step after completion of the polymerization step, drying under heating is performed, preferably, under the following condition (A) or (B), more preferably (A) and (B). That is, it is preferable that hydrogel is charged to the drying step immediately, without staying long and storing hydrogel, by directly connecting the polymerization step or the fine granulation step to the drying step.

(A) After completion of the polymerization step, hydrogel is dried under heating, so that solid content becomes 70% by weight or higher, preferably 75% or more, more preferably 80% or more, preferably within 10 minutes. More preferably, after completion of the polymerization step, hydrogel is dried under heating, so that solid content becomes 65% by weight or higher, preferably 70% by weight or more, within 5 minutes.

(B) After completion of the polymerization step, solid content of hydrogel is increased 10% or higher, preferably 20% or more, more preferably 30% or more, within 10 minutes. More preferably, after completion of the polymerization step, solid content of hydrogel is dried by under heating to 65% by weight or higher, preferably 70% by weight or more, within 5 minutes.

In this way, by supplying hydrogel to the drying step immediately after the polymerization step, reduction of coloring, enhancement of absorbency or extractables of the water-absorbent resin can be attained.

In the PATENT LITERATURE 17 or the PATENT LITERATURE 19, hydrogel after polymerization is stored before drying, or hydrogel is subjected to the predetermined treatment, and there has been no disclosure on technique for increasing solid content in a short period of time after the polymerization step.

In order to attain the (A) or (B), hydrogel taken out from a polymerization apparatus is put in a drying machine continuously, and residence time thereof is within 1 minute, preferably within 0.5 minutes, still more within 0.2 minutes. Still more, upper limit of the solid content after completion of the drying step of 5 minutes or 10 minutes is 90% by weight or less, still more preferably 85% by weight or less. In addition, temperature of a hydrogel-like cross-linked polymer from after polymerization to initiation of drying is controlled preferably at 50 to 80° C., still more preferably at 60 to 70° C.

In addition, in the drying step of the present aspect, it is preferable that hydrogel, having solid content increased to 93% by weight or more by drying, is dried under heating for still more 5 minutes or longer. By further drying under heating of hydrogel nearly dried in this way, absorbency against non-pressure (CRC) enhances.

(5) Pulverization Step and Classification Step

After the above dying step, the obtained dried substance may be pulverized, as needed, to adjust particle size. By the pulverization step, a pulverized substance (irregular-shaped fractured-state water-absorbent resin powder) is obtained, where a dried substance obtained by the above drying step is pulverized. In the case of performing a surface cross-linking step to be described later, it is preferable to control particle size within a specific range, to enhance property of the water-absorbent resin.

A method for pulverization is not especially limited, however, there is include, for example, a pulverization method using a conventionally known pulverization machine such as a roll mill, a hammer mill, a roll granulator, a jaw crusher, a gyratory crusher, a cone crusher, a roll crusher, a cutter mill or the like. Among these, in view of particle size control, pulverization using the roll mill or the roll granulator in multi-stage is preferable. In addition, as a classification method, various classification machines such as sieve classification, through-flow classification can be used. It should be noted that particle size (specified by JIS Z8801-1 (2000)) can be controlled as appropriate by the above-described polymerization step (in particular, reverse phase suspension polymerization), pulverization, classification, granulation, fine powder recovery or the like.

Weight average particle diameter (D50) of a pulverized substance obtained by said pulverization step is preferably 200 to 600 μm, more preferably 200 to 550 μm, still more preferably 250 to 500 μm, and particularly preferably 350 to 450 μm. In addition, the less amount of particles below 150 μm is the better, and content of particles below 150 μm is preferably 0 to 5% by weight, more preferably 0 to 3% by weight, and still more preferably 0 to 1% by weight. Further the less amount of particles with 850 μm or larger is the better, and content of particles over 850 μm is preferably 0 to 5% by weight, more preferably 0 to 3% by weight, and still more preferably 0 to 1% by weight. Logarithm standard deviation ($\sigma\zeta$) of the particle size distribution is set at preferably 0.20 to 0.40, more preferably 0.27 to 0.37, further preferably 0.25 to 0.35. These property values are measured using standard sieves, for example, by methods described in WO 2004/069915 pamphlet or EDANA-ERT420.2-02.

In addition, in the present invention, ratio of particles with a diameter of 150 to 180 μm, relative to total weight, is preferably 95% by weight or more, more preferably 98% by weight or more (upper limit is 100% by weight). It is preferable that a dried substance or powder having this ratio is surface cross-linked. In addition, particle size before the above surface cross-linking may also be applied to preferably after surface cross-linking, and further to a final product.

Generally, by controlling particle size distribution narrow, that is, by controlling upper limit and lower limit of the particle size, it tends to make value of coloring degree of the water-absorbent resin larger in view of measurement, however, since coloring of the water-absorbent resin can be suppressed according to the production method of the present aspect, such a problem is difficult to occur. Therefore, in the classification step, it is controlled so as to attain ratio of particles with a diameter of 850 to 150 μm, preferably 95% or more, more preferably 98% or more (provided the upper limit is 100%).

(6) Surface Cross-Linking Step

In the production method of the present aspect, it is preferable to further include a step for surface cross-linking water-absorbent resin powder obtained by the above steps (the drying step, the pulverization step or the classification step). By performing said surface cross-linking step, a more white water-absorbent resin having less coloring can be obtained.

A method for the surface cross-linking is not especially limited, and includes, for example, a method for cross-linking the surface of water-absorbent resin powder using a surface cross-linking agent. In particular, surface cross-linking by heating at high temperature is suitable.

As the surface cross-linking agent which can be used in the surface cross-linking step of the present aspect, various organic or inorganic surface cross-linking agents can be exemplified, and the organic surface cross-linking agents are used preferably. Said organic surface cross-linking agents may be used in combination with ion-bonding-type surface cross-linking agents.

As the organic surface cross-linking agents, there are included compounds which have been exemplified in U.S. Pat. No. 6,228,930 specification, U.S. Pat. No. 6,071,976 specification, U.S. Pat. No. 6,254,990 specification, etc., for example, a polyol compound, such as mono-, di-, tri-, tetra-propylene glycol, 1,3-propanediol, glycol, 1,4-butanediol, 1,3-butanediol, 1,5-pentanediol, 1,6-hexanediol, sorbitol; an epoxy compound such as ethylene glycol diglycidyl ether, glycidol; a condensate of a polyvalent amine compound and a haloepoxy compound thereof; oxazoline compound; a (mono-, di-, or poly-) oxazolidinone compound; an alkylene carbonate compound such as ethylene carbonate; an oxetane compound; a periodic urea compound such as 2-imidazolidinone; and the like. Among these, a surface cross-linking agent having dehydration esterification reactivity composed of the polyol compound, the alkylene carbonate compound, and the oxazolidinone compound, requiring a reaction at high temperature, may be used particularly preferably. The organic surface cross-linking agents may be used alone, or two or more kinds in combination.

In addition, as the inorganic surface cross-linking agent, there is included, for example, a salt (an organic salt or an inorganic salt) of a two-valent, preferably three-valent or tetra-valent polyvalent metal or a hydroxide or the like. As said polyvalent metal, aluminum, zirconium, or the like is included, and as the salt of the polyvalent metal, aluminum lactate and aluminum sulfate are included.

It is preferable that use amount of the surface cross-linking agent is 0.001 to 10 parts by weight, more preferably 0.01 to 5 parts by weight, relative to 100 parts by weight of water-absorbent resin powder.

In using the surface cross-linking agent, preferably water is used. Use amount of said water is not especially limited, however, it is preferably 0.5 to 20 parts by weight, more preferably 0.5 to 10 parts by weight, relative to 100 parts by weight of the water-absorbent resin powder.

Further, in using the surface cross-linking agent, a hydrophilic organic solvent may be used in addition to the water. Use amount of said hydrophilic organic solvent is not especially limited, however, it is preferably 0 to 10 parts by weight, more preferably 0 to 5 parts by weight, relative to 100 parts by weight of the water-absorbent resin powder As the hydrophilic organic solvent, there is included, for example, alcohols such as methyl alcohol, ethyl alcohol, propyl alcohol, isopropyl alcohol, butyl alcohol, isobutyl alcohol, t-butyl alcohol; ketones such as acetone, methyl ethyl ketone; ethers such as dioxane, alkoxy(poly)ethylene glycol, tetrahydrofuran; amides such as ε-caprolactam, N,N-dimethylformamide; sulfoxides such as dimethylsulfoxide; polyvalent alcohols such as ethylene glycol, diethylene glycol, propylene glycol, triethylene glycol, tetraethylene glycol, 1,3-propanediol, dipropylene glycol, 2,2,4-trimethyl-1,3-pentanediol, glycerin, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, pentaerythritol, sorbitol; and the like, and one kind or two or more kinds thereof may be used.

In mixing the water-absorbent resin powder and a surface cross-linking agent solution, water-insoluble fine particulate powder or a surfactant may be present at the same time, within a range not to interfere effect of the present invention. Use amount of said water-insoluble fine particulate powder or surfactant is preferably 0 to 10 parts by weight, more preferably 0 to 5 parts by weight, still more preferably 0 to 1 part by weight, relative to 100 parts by weight of the water-absorbent resin powder. Kind of the surfactant or use amount thereof has been described in U.S. Pat. No. 7,473,739.

A mixed solution of the water-absorbent resin powder and the surface cross-linking agent solution is subjected to heating treatment, and then cooling treatment, as needed. Heating temperature is preferably 70 to 300° C., more preferably 120 to 250° C., still more preferably 150 to 250° C. In addition, heating time is preferably 1 minute to 2 hours. Heating treatment may be performed in a usual drying machine or a heating furnace. It should be noted that methods for surface cross-linking which have been described in EUP No. 0349240 specification, EUP No. 0605150 specification, EUP No. 0450923 specification, EUP No. 0812873 specification, EUP No. 0450924 specification, EUP No. 0668080 specification, JP-A-7-242709, JP-A-7-224304, U.S. Pat. No. 5,409,771 specification, U.S. Pat. No. 5,597,873 specification, U.S. Pat. No. 5,385,983 specification, U.S. Pat. No. 5,610,220 specification, U.S. Pat. No. 5,633,316 specification, U.S. Pat. No. 5,674,633 specification, U.S. Pat. No. 5,462,972 specification, WO 99/42494 pamphlet, WO 99/43720 pamphlet, WO 99/42496 pamphlet or the like may also be applied to the production method of the present aspect.

According to the production method of the present aspect, the water-absorbent resin with high whiteness can be provided, even in the case where drying using high temperature heating or hot air is adopted, which has conventionally caused significant coloring.

In particular, in using the water-absorbent resin produced by the production method of present aspect, in a sanitary material (in particular, disposable diapers), by said surface cross-linking step, absorbency against pressure (AAP) to be described later can be enhanced to a preferable range of 20 g/g or more.

(7) Other Steps

As other than the above-described steps, a surface treatment step of the polyvalent metal salt, a recycling step of an evaporated monomer, a granulation step, a fine powder removal step, a fine powder recycling step or the like may be installed, as needed. Further, in order to reduce time course coloring (enhancement of stability effect) or to prevent gel deterioration or the like, the above-described additives may be used in the monomer or a polymer thereof (hydrogel).

The surface cross-linking step of the polyvalent metal salt may be performed, in the case where high liquid permeation against pressure (SFC as described in U.S. Pat. No. 5,669,894 specification, or GBP as described in WO 2004/96303 pamphlet and WO 2005/016393 pamphlet, or the like) is required. For example, a method described in U.S. Pat. No. 6,605,673 specification and U.S. Pat. No. 6,620,899 specification may be applicable.

In the production method of the present aspect, it is preferable to include the fine powder recycling step. The fine particle recycling step is a step for recycling fine powder (for example, having particles below 150 μm, as a main component; particularly preferably, including particles below 150 μm in an amount of 70% by weight or more) removed by the classification step or the like, after separation, as it is, or after gelling by adding water, to the polymerization step or the drying step. As the preferable method of fine particle recycling, for example, a method described in US-A-2006/247351 specification, U.S. Pat. No. 6,228,930 specification is included. By performing the fine powder recycling step, control of particle size or control of solid content of hydrogel can be performed easily. Further, by adding fine powder, a dried substance of hydrogel can be peeled easily from the through-flow belt, and is thus preferable.

In a production method for the water-absorbent resin including the conventional fine particle recycling step, there may be the case where drying of hydrogel added with fine powder becomes non-uniform, in the case of recycling fine powder to the drying step, or there may be the case where the residual monomer increases, in the case of recycling fine powder to the polymerization step, thus property decrease was observed, such as decrease in absorbency or the like, while according to the production method for the water-absorbent resin of the present aspect, even in the case of performing the fine power recycling step, decrease in property or coloring of the water-absorbent resin can be suppressed effectively.

<3> Property of the Water-Absorbent Resin

The production method for the water-absorbent resin of the present aspect is suitable for the case of producing the water-absorbent resin satisfying at least one of the following properties (a) to (f), preferably two or more including AAP, and more preferably three or more including AAP. The water-absorbent resin satisfying these properties are preferably applied to hygiene materials, in particular, disposable diapers. The case, where the water-absorbent resin does not satisfy these properties, may not exert sufficient performance in a high concentration disposable diaper with a concentration of the water-absorbent resin of 40% by weight or more.

(a) Initial Coloring

The water-absorbent resin, obtained by the production method of the present aspect, has small initial coloring. Specifically it has, in Hunter Lab surface color system, "L" value (Lightness) of preferably 85 or higher, more preferably 87 or higher, and still more preferably 89 or higher; "b" value is −5 to 10, more preferably −5 to 9, still more preferably −4 to 8 and particularly preferably −1 to 7; and "a" value is preferably −2 to 2, more preferably −1 to 1, still more preferably −0.5 to 1, and particularly preferably 0 to 1. "YI" is preferably 10 or lower, more preferably 8 or lower, and still more preferably 6 or lower. "WB" is preferably 70 or higher, more preferably 75 or higher, and still more preferably 77 or higher. Further, the water-absorbent resin obtained by the production method of the present aspect has superior small time course coloring and shows sufficient whiteness degree, even in a model test for a long period of storage under high temperature and high humidity.

(b) Absorbency Against Pressure (AAP)

The water-absorbent resin, obtained by the production method of the present aspect, may attain absorbency (AAP) of preferably 10 [g/g] or higher, more preferably 20 [g/g] or higher, still more preferably 22 [g/g] or higher, and particularly preferably 24 [g/g] or higher, for the 0.9% by weight sodium chloride aqueous solution, under a load condition of 0.3 psi, more preferably 0.7 psi. The higher AAP is the more preferable, however, in consideration of valance with other properties, the upper limit is 40 [g/g] or lower. AAP within the above range is capable of preventing leakage in disposable diapers.

(c) Liquid Permeation (SFC)

The water-absorbent resin, obtained by the production method of the present aspect, may attain flow conductivity of 0.69% sodium chloride aqueous solution (SFC), which is one index of liquid permeation against pressure, of preferably 1 $[\times 10^{-7} \cdot cm^3 \cdot s \cdot g^{-1}]$ or higher, more preferably 10 $[\times 10^{-7} \cdot cm^3 \cdot s \cdot g^{-1}]$ or higher, still more preferably 50 $[\times 10^{-7} \cdot cm^3 \cdot s \cdot g^{-1}]$ or higher, particularly preferably 70 $[\times 10^{-7} \cdot cm^3 \cdot s \cdot g^{-1}]$ or higher, and most preferably 100 $[\times 10^{-7} \cdot cm^3 \cdot s \cdot g^{-1}]$ or higher. SFC within the above range is capable of preventing leakage in disposable diapers.

(d) Absorbency Against Non-Pressure (CRC)

The water-absorbent resin, obtained by the production method of the present aspect, may attain absorbency against non-pressure (CRC) of preferably 10 [g/g] or higher, more preferably 20 [g/g] or higher, still more preferably 25 [g/g] or higher, and particularly preferably 30 [g/g] or higher. The higher CRC is the better, and the upper limit value is not especially limited, however, in view of valance with other properties, it is preferably 100 [g/g] or lower, more preferably 50 [g/g] or lower, still more preferably 45 [g/g] or lower, and particularly preferably 40 [g/g] or lower.

(e) Extractables (Amount of Water-Soluble Components)

The water-absorbent resin, obtained by the production method of the present aspect, may attain extractables of preferably 0 to 35% by weight or lower, more preferably 25% by weight or lower, still more preferably 15% by weight or lower, and particularly preferably 10% by weight or lower.

(f) Residual Monomer Amount

The water-absorbent resin, obtained by the production method of the present aspect, may attain residual monomer amount of preferably 0 to 400 ppm by weight, more preferably 0 to 300 ppm by weight, and still more preferably 0 to 200 ppm by weight.

(g) Solid Content

It is preferable that the water-absorbent resin obtained by the production method of the present aspect has a solid content of preferably 85 to 99.9% by weight, more preferably 90 to 99.9% by weight, still more preferably 95 to 99.9% by weight. When the solid content is controlled within the above range, decrease in property of the water-absorbent resin can be prevented.

In the present invention, particularly preferable one among the above is the polyacrylic acid (salt)-type water-absorbent resin, and exerts more effect in the case of satisfying at least one of the following (a) to (c). That is, the present invention may be applied preferably to the production method for the water-absorbent resin satisfying at least one, still more two or more and particularly three or more of the following (a) to (c):
(a) absorbency against non-pressure (CRC) is 20 to 100 g/g;
(b) absorbency against pressure (AAP0.3 psi or AAP0.7 psi) is 10 g/g to 40 g/g; and (c) saline flow conductivity (SFC) is 10 $(\times 10^{-7} \cdot cm^3 \cdot s \cdot g^{-1})$ or higher. It should be noted that more preferable range of CRC/AAP/SFC is as described above.

<4> Applications of the Water-Absorbent Resin

Applications of the water-absorbent resin of obtained by the production method of the present aspect are not especially limited, however, it may be preferably used in absorbent articles such as disposable diapers, sanitary napkins, incontinent pads; agriculture and gardening applications; waste liquid solidification applications; civil engineering and construction applications; and the like. Among these applications, when it is used in absorbent articles using the water-absorbent resin in high concentration, particularly superior performance is exerted.

In the case where it is used in absorbent articles using the water-absorbent resin in high concentration, content (core concentration) of the water-absorbent resin included in an absorbing body in said absorbing articles is usually 30 to 100% by weight, preferably 40 to 100% by weight, more preferably 50 to 100% by weight, still more preferably 60 to 100% by weight, particularly preferably 70 to 100% by weight, and most preferably 75 to 95% by weight.

Since the water-absorbent resin obtained by the production method of the present aspect is superior in liquid permeation (liquid permeation against pressure), body fluid such as urine or the like absorbed is diffused quickly, even in the case where the water-absorbent resin is included in an absorbing body in high concentration. This effect is particularly significant in the case of using it at the upper layer part of the absorbing body. Therefore, in absorbent articles such as disposable diapers, efficient liquid distribution is performed, thus enabling to enhance absorption amount of the whole absorbent article. In addition, since the water-absorbent resin obtained by the production method of the present aspect provides little coloring, a white state of the absorbing body can be maintained, and clean appearance can be maintained for a long period of time.

In addition, it is preferable that the above absorbing body is compression molded so as to attain a range of a density of 0.06 to 0.50 g/cc, and a basis weight of 0.01 $g/cm^2$ to 0.20 $g/cm^2$. Still more, by setting thickness of the absorbing body at preferably 30 mm or less, more preferably 20 mm or less, still more preferably 10 mm or less, the absorbing body may be used suitably in absorbent articles such as thin-type disposable diapers.

EXAMPLES

Explanation will be given below on action effect of the present invention with reference to Examples and Comparative Examples, however, technical scope of the present invention should be determined by description of claims, and should not be limited only to the following Examples. It should be noted that various properties described in claims and Examples were determined according to ERT/EDANA or the following measurement methods.

(a) Initial Coloring and Time Course Coloring

They were measured by a method described in WO 2009/005114 pamphlet.

(b) Solid Content of Hydrogel or the Water-Absorbent Resin

By putting the water-absorbent resin weighed accurately in advance, in an aluminum cup with a bottom face diameter of about 50 mm, total weight W1 [g] of the water-absorbent resin and the aluminum cup was measured. Standard use amount of the water-absorbent resin is about 1 g. After that, it was stood still in an oven at an atmosphere temperature of 180° C. for 3 hours. After 3 hours, the water-absorbent resin and the aluminum cup taken out from the oven were cooled sufficiently to room temperature in a desiccator, and then total weight W2 [g] of the water-absorbent resin and the aluminum cup after drying was measured to determine solid content [% by weight] according to the following EXPRESSION 3.

[MATH. 3]

Solid content [% by weight]=100−100×(W1−W2)/(weight of the water-absorbent resin used [g])  [EXPRESSION 3]

Solid content of hydrogel was measured by a similar operation as in the case of the water-absorbent resin, except that standard use amount of hydrogel was set at about 2 to 4 g, and stationary drying was performed in an oven for 24 hours.

(c) Saline Flow Conductivity (SFC)

It was measured by a method described in U.S. Pat. No. 5,669,894 specification.

(d) GEX Value

According to US-A-2006/0167198 specification, GEX value was calculated. The GEX value is defined by the following EXPRESSION 4 or 5, provided that absorbency against non-pressure (CRC) is represented by y [g/g], and extractables is represented by x (% by weight).

[MATH. 4]

GEX value=(y+17)/ln(x) (in the case of x>1)

ln(x): natural logarithm of x  [EXPRESSION 4]

[MATH. 5]

GEX value=y/x (in the case of x≤1)  [EXPRESSION 5]

In relation between CRC and extractables, the smaller extractables is the better for CRC, and GEX value is one index to evaluate this. The larger said GEX value shows the higher performance of the water-absorbent resin.

(e) Other Properties

According to a method described in ERT/EDANA or US-A-2006/204755, absorbency against non-pressure (CRC) in a 0.9% sodium chloride aqueous solution, particle size distribution, pH, extractables, residual amount of acrylic acid were measured.

Example 1

Polymerization Step

An aqueous solution of 75% by mole neutralized partial sodium acrylate (a monomer concentration of 38% by weight), including 0.07% by mole (relative to the monomer) of polyethyleneglycol diacrylate (an average molecular weight of 400), as an inner cross-linking agent, was prepared as a monomer aqueous solution. Into a container, said monomer aqueous solution was continuously fed using a constant feed pump. In this case, by continuously blowing nitrogen gas in the middle of a transportation tube, oxygen concentration in the monomer aqueous solution was made at 0.5 ppm or lower. Into said monomer aqueous solution, 0.14 g of sodium persulfate and 0.005 g of L-ascorbic acid per 1 mole of the monomer were continuously mixed by line mixing. Then, this mixture was supplied onto a plane steel belt having a weir at the both ends, so as to attain a thickness of about 30 mm, and continuous stationary aqueous solution polymerization was performed for 30 minutes to obtain hydrogel.

<Fine Granulation Step>

By finely crushing the obtained hydrogel with a meat chopper having a pore diameter of 7 mm, particulate hydrogel (A), having a weight average particle diameter of 1.3 mm and a solid content of 39% by weight, was obtained.

<Drying Step>

The particulate hydrogel (A) (a hydrogel temperature of 60° C., and a solid content of 39% by weight) was continuously loaded on a continuously moving through-flow belt (punching metal), by controlling sequence of a traverse feeder (so as to be high speed at the both end parts), using the traverse feeder as a continuous through-flow belt-type drying machine. Then, the particulate hydrogel on the through-flow belt was continuously dried for about 38 minutes. Thickness of the particulate hydrogel, area occupancy rate, the drying machine and drying condition are as follows.

(Drying Machine)

The continuous through-flow belt-type drying machine was used, having six drying rooms in total, through which the through-flow belt passes, and whose hot air condition can be adjusted each independently. It should be noted that length of a belt of the through-flow belt was 17 m, belt width was 1.2 m and transfer speed of the continuous through-flow belt was 0.25 m/minute.

(Temperature and Linear Speed of Hot Air)

Hot air temperature of the drying room and linear speed of the hot air were set at 170° C. and 1.0 m/sec, respectively. In addition, dew point was adjusted by mixing steam to hot air, so as to attain a dew point of 80° C. at a drying room at the entrance (the first room) of the drying machine, and a dew point of 20° C. at a drying room (the sixth room) at the vicinity of the exit of the drying machine. It should be noted that, in the linear speed of 1.0 [m/sec], wind direction in the first room was set up-flow from the bottom face, while wind direction in the sixth room was set down-flow from the top part of the drying machine to the bottom face.

(Through-Flow Belt)

A material of the through-flow belt is SUS304, opening pore rate was 33% and average area of the pore was 16 mm².

(Thickness of Hydrogel and Area Occupancy Rate)

The particulate hydrogel (A) loaded on the through-flow belt by the traverse feeder had a thickness variation rate (1) of 1.41 and a thickness variation rate (2) of 1.33. In addition, average value of thickness of hydrogel was 10.5 cm, and area occupancy rate (and width occupancy rate) was 95%. It should be noted that measurement of thickness of the particulate hydrogel loaded on the through-flow belt was performed using a laser-type displacement sensor.

The hydrogel was sampled at 5 minutes and 10 minutes after initiation of drying to measure solid content, and found to be 67% by weight and 72% by weight, respectively. Further, solid content of a dried substance obtained by drying hydrogel, having a dried solid content of 93% by weight, on a belt for about 8 minutes in the sixth room, was 94% by weight.

<Pulverization Step and Classification Step>

After pulverization of total amount of a dried substance after the drying, by continuously supplying it to a three-stage roll mill (roll gap was 1.0 m/0.55 mm/0.42 mm from the top side), it was classified using a sieving apparatus, having a metal sieve screen with a sieve mesh size of 850 μm, to obtain a water-absorbent resin (1). It should be noted that there was no adhered substance derived from the undried substance, at the surface of the roll mill after pulverization. Analysis result of the water-absorbent resin (1a) is shown in Table 1.

<Surface Cross-Linking Step>

The obtained water-absorbent resin (1) was continuously supplied to a high speed continuous mixing machine in a rate of 1500 kg/hr using a constant supplying machine. Then, a surface treatment agent solution composed of mixed liquid of 0.3 parts by weight of 1,4-butane diol, 0.5 parts by weight of propylene glycol and 2.7 parts by weight of pure water, relative to 100 parts by weight of the water-absorbent resin, was sprayed and mixed using a sprayer.

Next, the obtained mixture was heat processed continuously at 198° C. for 40 minutes using a paddle dryer, and then, under spraying addition of 0.5 parts by weight of aluminum sulfate, 1 part by weight of water and 0.05 parts by weight of propylene glycol, relative to 100 parts by weight of the obtained powder, it was subjected to forced cooling to 60° C. using the puddle dryer. Further, a substance passed through 850 μm was classified using a sieve classification apparatus. In this case, coarse powder remained on a sieve screen with a sieve mesh size of 850 μm was pulverized again, and then mixed with the substance passed through 850 μm. In this way, a water-absorbent resin (1b) was obtained, which has been surface cross-linked and is one all passed through a sieve of 850 μm. Analysis result of the water-absorbent resin (1b) is shown in Table 2.

Example 2

By performing similar operation in the polymerization step of Example 1, except that monomer concentration of the monomer aqueous solution was set at 45% by weight, use amount of sodium persulfate was set at 0.1 g per 1 mole of the monomer, and L-ascorbic acid was not used, particular hydrogel (B) was obtained. Weight average particle diameter and solid content of the particular hydrogel (B) were 1.2 mm and 46% by weight, respectively.

In addition, drying was performed by similar operation as in Example 1, except that the thickness variation rate (1), the thickness variation rate (2), the average thickness value, and the area occupancy rate (and the width occupancy rate) of the particular hydrogel (B), loaded on the through-flow belt by the traverse feeder controlled in non-constant speed (higher speed at the both ends), in the drying step of Example 1, were set at 1.38, 1.45, 10.3 cm and 96%, respectively.

Solid contents of the hydrogel at 5 minutes and 10 minutes after initiation of drying were 70% by weight and 85% by weight, respectively. Further, solid content of a dried substance obtained by drying hydrogel, having a dried solid content of 95% by weight, on a belt for about 8 minutes in the sixth room, was 96.0% by weight.

After drying, similar pulverization step and classification step as in Example 1 were performed to obtain a water-absorbent resin (2a). It should be noted that there was no adhered substance derived from the undried substance, at the surface of the roll mill after pulverization. Analysis result of the water-absorbent resin (2a) is shown in Table 1.

Further, a surface cross-linked water-absorbent resin (2b) was obtained by performing similar surface cross-linking step as in Example 1, as for the water-absorbent resin (2a). Analysis result of the water-absorbent resin (2b) is shown in Table 2.

Comparative Example 1

In the drying step of Example 1, dew point at the first room, and the sixth room of the drying machine were adjusted at 55° C. and 60° C., respectively. The through-flow belt having a pore opening rate of 52% and an average pore area of 8 mm$^2$ was used. Drying was performed by similar operation as in Example 1, except that the thickness variation rate (1), the thickness variation rate (2), the average thickness value, and the area occupancy rate (and the width occupancy rate) of the particular hydrogel (A), loaded on the through-flow belt by the traverse feeder, were set at 5.51, 3.80, 14.6 cm and 84%, respectively.

Solid contents of the hydrogel at 5 minutes and 10 minutes after initiation of drying were 55% by weight and 67% by weight, respectively. Further, solid content of a dried substance obtained by drying hydrogel, having a dried solid content of 88% by weight, on a belt for about 8 minutes in the sixth room, was 90% by weight.

After drying, similar pulverization step and classification step as in Example 1 were performed to obtain a comparative water-absorbent resin (1a). It should be noted that there was present adhered substance derived from the undried substance, at the surface of the roll mill after pulverization. Analysis result of the comparative water-absorbent resin (1a) is shown in Table 1.

Comparative Example 2

In the drying step of Comparative Example 1, drying was performed by similar operation as in Comparative Example 1, except that the thickness variation rate (1), the thickness variation rate (2), the average thickness value, and the area occupancy rate (and the width occupancy rate) of the particular hydrogel (A), loaded on the through-flow belt by the traverse feeder, were set at 1.02, 1.01, 8.6 cm and 82%, respectively.

Solid contents of the hydrogel at 4 minutes and 10 minutes after initiation of drying were 61% by weight and 67% by weight, respectively. Still more, solid content of a dried substance obtained by drying hydrogel, having a dried solid content of 89% by weight, on a belt for about 8 minutes in the sixth room, was 92% by weight.

After drying, similar pulverization step and classification step as in Example 1 were performed to obtain a comparative water-absorbent resin (2a). Analysis result of the comparative water-absorbent resin (2a) is shown in Table 1.

TABLE 1

|  |  | Example 1 Water-absorbent resin (1a) | Example 2 Water-absorbent resin (2a) | Comparative Example 1 Comparative water-absorbent resin (1a) | Comparative Example 2 Comparative water-absorbent resin (2a) |
|---|---|---|---|---|---|
| Drying step | hydrogel | hydrogel (A) | hydrogel (A) | hydrogel (A) | hydrogel (A) |
|  | Thickness variation rate (1) | 1.41 | 1.38 | 5.51 | 1.02 |
|  | Thickness variation rate (2) | 1.33 | 1.45 | 3.8 | 1.01 |
|  | Pore opening rate [%] | 33 | 33 | 52 | 52 |
|  | Area occupying rate [%] | 95 | 96 | 84 | 82 |
| Property | Solid content [wt %] | 95.4 | 96.5 | 88.0 | 94.0 |
|  | D50 [μm] | 450 | 460 | 500 | 470 |
|  | σζ | 0.39 | 0.41 | 0.51 | 0.5 |
|  | Fine dust below 150 μm | 0.9 | 0.5 | 1.3 | 2.9 |
|  | CRC [g/g] | 35.3 | 35.1 | 31.1 | 36.1 |
|  | Extractables [wt %] | 8.1 | 6.8 | 8.7 | 15.4 |
|  | GEX value | 25.0 | 27.2 | 22.2 | 19.4 |
|  | Residual monomer amount [ppm] | 350 | 250 | 800 | 400 |
|  | Coloring degree, b value | 6.8 | 5.5 | 8.0 | 9.3 |

TABLE 2

|  |  | Example 3 Water-absorbent resin (1b) | Example 4 Water-absorbent resin (1b) |
|---|---|---|---|
| Dried substance (before surface cross-linking) |  | Water-absorbent resin (1a) | Water-absorbent resin (2a) |
| Property | D50 [μm] | 450 | 460 |
|  | σζ | 0.38 | 0.39 |
|  | Fine powder below 150 μm [wt %] | 0.4 | 0.3 |
|  | DRC [g/g] | 30.5 | 30.3 |
|  | AAP 0.3 psi [g/g] | 28.9 | 29.1 |
|  | AAP 0.7 psi [g/g] | 25.6 | 26.1 |
|  | SFC [$10^{-7} \cdot cm^3 \cdot s \cdot g^{-1}$] | 30 | 30 |
|  | Coloring degree, b value | 7.1 | 5.9 |

According to the Tables 1 and 2, it has been shown that the water-absorbent resin obtained by the production method of the present invention has no un-dried substance and is superior in various properties, as compared with Comparative hydrogels.

INDUSTRIAL APPLICABILITY

As described above, according to the present invention, in the drying step of hydrogel with high solid content (35% by weight or higher, preferably 40% by weight or higher, more preferably 45% by weight or higher), the low cost water-absorbent resin with excellent property can be produced stably, by such a simple method as controlling pore opening rate of the through-flow belt and area occupancy rate on the through-flow belt within a predetermined range, without requiring large change of additives (surfactant) or a production apparatus as in a conventional method.

DESCRIPTION OF REFERENCE NUMERALS

100 A screw extruder in the fine granulation step of hydrogel (another name; a meat chopper)
110 Particulate hydrogel
200 A traverse feeder (another name; head swing feeder)
300 An through-flow drying machine
310 A continuous through-flow belt
320 A drying bat
θ Head swing angle

The invention claimed is:

1. A production method for a water-absorbent resin, comprising a polymerization step for obtaining a hydrogel by subjecting an aqueous monomer solution to a polymerization reaction, and a drying step for drying the hydrogel, wherein drying in the drying step is performed using a continuous through-flow belt-type drying machine, the pore opening rate of the through-flow belt in the continuous through-flow belt-type drying machine is 25 to 40%, solid content of the hydrogel supplied to the drying step is 35% by weight or more, the hydrogel is loaded on the through-flow belt of the continuous through-flow belt-type drying machine by using a traverse feeder or an oscillating feeder operated at a non-constant peripheral speed, the area occupancy rate of the hydrogel is 87 to 99% relative to the through-flow belt, and the hot air in the continuous through-flow belt-type drying machine is directed both up-flow and down-flow.

2. A production method for a water-absorbent resin, comprising a polymerization step for obtaining a hydrogel by subjecting an aqueous monomer solution to a polymerization reaction, and a drying step for drying the hydrogel, wherein drying in the drying step is performed using a continuous through-flow belt-type drying machine, pore opening rate of the through-flow belt in the continuous through-flow belt-type drying machine is 25 to 40%, solid content of the hydrogel supplied to the drying step is 35% by weight or more, the hydrogel is loaded on the through-flow belt of the continuous through-flow belt-type drying machine by using a traverse feeder or an oscillating feeder operated at a non-constant peripheral speed, the width occupancy rate of the hydrogel is 87 to 99% relative to the through-flow belt, and the hot air in the continuous through-flow belt-type drying machine is directed both up-flow and down-flow.

3. The production method according to claim 1, wherein the average area of a pore of the through-flow belt is 5 to 500 mm².

4. The production method according to claim 1, wherein the through-flow belt is a punching metal.

5. The production method according to claim 1, wherein the thickness variation rate (1), represented by the following EXPRESSION 1, of the hydrogel loaded onto the through-flow belt is 1.05 to 5:

[MATH. 1]

Thickness variation rate (1)=(Maximum thickness of hydrogel in a width direction of the through-flow belt)/(Average thickness of hydrogel in a width direction of the through-flow belt)   [EXPRESSION 1].

6. The production method according to claim 1, wherein the thickness variation rate (2), represented by the following EXPRESSION 2, of the hydrogel loaded onto the through-flow belt is 1.05 to 3.00:

[MATH. 2]

Thickness variation rate (2)=(Maximum thickness of hydrogel at the both end parts of the through-flow belt)/(Maximum thickness of hydrogel at the center part of the through-flow belt)  [EXPRESSION 2].

7. The production method according to claim 1, wherein the length of the through-flow belt is 5 to 100 m, the width of the through-flow belt is 1 to 10 m, and the thickness of the hydrogel loaded on the through-flow belt is 1 to 30 cm.

8. The production method according to claim 1, wherein fine powder separated by a classification step after the drying step, as is or hydrated, is recycled to the polymerization step or the drying step.

9. The production method according to claim 1, further comprising a fine granulation step for finely granulating the hydrogel after the polymerization step but before the drying step.

10. The production method according to claim 1, wherein, in the drying step, the solid content of the hydrogel is made 70% by weight or higher within 10 minutes after the polymerization step.

11. The production method according to claim 1, wherein, in the drying step, the solid content of the hydrogel is made 65% by weight or higher within 5 minutes after the polymerization step.

12. The production method according to claim 1, wherein drying in the drying step is performed by exposing the hydrogel to hot air at a temperature of 150 to 230° C. and a flow rate of 3 m/sec or less.

13. The production method according to claim 1, wherein the aqueous monomer solution comprises methoxyphenols.

14. The production method according to claim 1, wherein the continuous through-flow belt-type drying machine is a continuous through-flow belt-type drying machine having five or more drying rooms.

15. The production method according to claim 1, wherein, in the drying step, the solid content of the hydrogel to be supplied to drying is 45 to 80% by weight.

16. The production method according to claim 1, wherein, in the drying step, the hydrogel made to have a solid content of 93% by weight or higher by drying is dried under heating for still more 5 minutes or longer.

17. The production method according to claim 1, wherein, in the drying step, the dew point is controlled so that it is lower at the second half of the drying step than at the first half of the drying step.

18. The production method according to claim 1, wherein the monomer comprises an acrylic acid (salt).

19. The production method according to claim 1, further comprising a pulverization step, a classification step, and a surface cross-linking step after the drying step.

20. The production method according to claim 1, characterized in that the water-absorbent resin is a polyacrylic acid (salt)-type water-absorbent resin, and satisfies at least one of the following (a) to (c):
  (a) absorbency against non-pressure (CRC) is 20 to 100 g/g;
  (b) absorbency against pressure (AAP 0.3 psi or AAP 0.7 psi) is 10 g/g to 40 g/g; and
  (c) saline flow conductivity (SFC) is 10 ($\times 10^{-7} \cdot cm^3 \cdot s \cdot g^{-1}$) or higher.

21. The production method according to claim 1, wherein the hydrogel is loaded on the continuous through-flow belt-type drying machine using a non-constant velocity traverse feeder, and the peripheral speed (m/s) of the traverse feeder is set to be higher at the both end parts than at the center part of the through-flow belt.

22. The production method according to claim 1, wherein the peripheral speed at both end parts of the through-flow belt of the traverse feeder is set to be 1.1 to 100 times higher than that of the peripheral speed at the center part.

* * * * *